US010171392B1

(12) United States Patent
Morris

(10) Patent No.: US 10,171,392 B1
(45) Date of Patent: *Jan. 1, 2019

(54) METHODS, SYSTEMS, AND COMPUTER PROGRAM PRODUCTS FOR PROCESSING A REQUEST FOR A RESOURCE IN A COMMUNICATION

(71) Applicant: SITTING MAN, LLC, Raleigh, NC (US)

(72) Inventor: Robert Paul Morris, Raleigh, NC (US)

(73) Assignee: Gummarus LLC, Longview, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/943,672

(22) Filed: Apr. 2, 2018

Related U.S. Application Data

(63) Continuation-in-part of application No. 15/803,733, filed on Nov. 3, 2017, now Pat. No. 9,998,410, which is a continuation-in-part of application No. 14/835,662, filed on Aug. 25, 2015, which is a continuation-in-part of application No. 13/867,040, filed on Apr. 20, 2013, which is a continuation of application No. 12/833,014, filed on Jul. 9, 2010, now Pat. No. 8,447,819, application No. 15/943,672,
(Continued)

(51) Int. Cl.
*H04L 12/58* (2006.01)
*H04L 29/08* (2006.01)

(52) U.S. Cl.
CPC ............ *H04L 51/08* (2013.01); *H04L 51/00* (2013.01); *H04L 29/08072* (2013.01)

(58) Field of Classification Search
CPC . H04L 51/046; H04L 51/08; H04L 29/08072; H04L 12/58; G06F 17/30392
See application file for complete search history.

(56) References Cited

U.S. PATENT DOCUMENTS 6,192,394 B1    2/2001 Gutfreund et al.
6,351,763 B1 *  2/2002 Kawanaka ........... G06Q 10/107
                                                 709/206
(Continued)

FOREIGN PATENT DOCUMENTS

WO    2002077773 A3    6/2009

OTHER PUBLICATIONS

Berners-Lee, T, et al, "Uniform Resource Identifier (URI): Generic Syntax", RFC 3986, pp. 1-61, Jan. 2005, Internet Engineering Task Force (IEFT), http://www.ietf.org/rfc/rfc3986.txt.
(Continued)

*Primary Examiner* — Rzau A Miah
(74) *Attorney, Agent, or Firm* — Patrick E. Caldwell, Esq.; The Caldwell Firm, LLC

(57) ABSTRACT

A computer-implemented method (and non-transitory media) are provided, comprising at least a portion of an instant messaging application that is configured to cooperate with an apparatus, the instant messaging application, when executed, configured to cause a device to: display an instant messaging interface including: a text entry user interface element for receiving entered text, one or more user interface elements for generating requests that are valid according to a criterion schema defining at least one of a format or a vocabulary, the one or more user interface elements including: a first menu item with corresponding first text.

30 Claims, 19 Drawing Sheets

Related U.S. Application Data which is a continuation-in-part of application No. 15/803,822, filed on Nov. 5, 2017, now Pat. No. 10,015,122, which is a continuation-in-part of application No. 15/800,033, filed on Oct. 31, 2017, which is a continuation-in-part of application No. 14/274,623, filed on May 9, 2014, which is a continuation-in-part of application No. 13/654,647, filed on Oct. 18, 2012, which is a continuation-in-part of application No. 13/716,156, filed on Dec. 16, 2012, which is a continuation-in-part of application No. 13/716,159, filed on Dec. 16, 2012.

(56) References Cited

U.S. PATENT DOCUMENTS

| | | | |
|---|---|---|---|
| 6,502,236 B1 | 12/2002 | Allen et al. | |
| 6,996,599 B1 | 2/2006 | Anders et al. | |
| 7,051,119 B2 | 5/2006 | Shafron et al. | |
| 7,080,120 B2 | 7/2006 | Betros et al. | |
| 7,130,883 B2 | 10/2006 | Zhu et al. | |
| 7,133,897 B1 | 11/2006 | Tran | |
| 7,209,953 B2 | 4/2007 | Brooks | |
| 7,328,239 B1 | 2/2008 | Berberian et al. | |
| 7,421,069 B2 | 9/2008 | Vernon et al. | |
| 7,426,578 B2 | 9/2008 | Jones et al. | |
| 7,529,798 B2 | 5/2009 | Rust | |
| 7,533,146 B1 | 5/2009 | Kumar | |
| 7,567,553 B2 | 7/2009 | Morris | |
| 7,613,772 B2 | 11/2009 | Bartram et al. | |
| 7,623,650 B2 | 11/2009 | Dalton et al. | |
| 7,624,148 B2 | 11/2009 | Dalen | |
| 7,640,309 B2 * | 12/2009 | Li et al. | G06Q 10/10 707/999.003 |
| 7,653,668 B1 | 1/2010 | Shelat et al. | |
| 7,680,950 B1 | 3/2010 | Slaughter et al. | |
| 7,701,882 B2 | 4/2010 | Jones et al. | |
| 7,757,265 B2 | 7/2010 | Reynolds et al. | |
| 7,765,581 B1 | 7/2010 | Caronni et al. | |
| 7,783,718 B2 | 8/2010 | Modi | |
| 7,809,709 B1 | 10/2010 | Harrison | |
| 7,809,854 B2 | 10/2010 | Jung et al. | |
| 7,904,369 B1 | 3/2011 | Andreasen et al. | |
| 7,949,722 B1 | 5/2011 | Ullman et al. | |
| 7,953,853 B2 | 5/2011 | Christensen et al. | |
| 7,970,850 B1 * | 6/2011 | Callanan | H04L 51/046 709/206 |
| 8,020,190 B2 | 9/2011 | Plummer | |
| 8,060,619 B1 | 11/2011 | Saulpaugh et al. | |
| 8,214,329 B2 | 7/2012 | Gilder et al. | |
| 8,224,298 B2 | 7/2012 | Smith et al. | |
| 8,280,948 B1 | 10/2012 | Chen | |
| 8,321,499 B2 | 11/2012 | Reisman | |
| 8,332,654 B2 | 12/2012 | Anbuselvan | |
| 8,359,361 B2 | 1/2013 | Thornton et al. | |
| 8,583,745 B2 | 11/2013 | Bearman et al. | |
| 8,671,145 B2 | 3/2014 | Roskowski et al. | |
| 8,683,576 B1 | 3/2014 | Yun | |
| 8,719,251 B1 | 5/2014 | English et al. | |
| 8,775,511 B2 | 7/2014 | Vernon et al. | |
| 8,812,733 B1 | 8/2014 | Black et al. | |
| 8,824,643 B2 | 9/2014 | Sahai | |
| 8,849,914 B2 | 9/2014 | Bove et al. | |
| 8,909,710 B2 | 12/2014 | Blackstock et al. | |
| 8,949,340 B2 | 2/2015 | Smith et al. | |
| 8,996,658 B2 | 3/2015 | Anbuselvan | |
| 9,053,203 B2 | 6/2015 | Wilson et al. | |
| 9,299,056 B2 | 3/2016 | Kallman et al. | |
| 2001/0047389 A1 * | 11/2001 | Prahlad | G06Q 10/107 709/206 |
| 2002/0087505 A1 | 7/2002 | Smith et al. | |
| 2002/0087522 A1 | 7/2002 | MacGregor et al. | |
| 2002/0143855 A1 | 10/2002 | Traversat et al. | |
| 2002/0147840 A1 | 10/2002 | Mutton et al. | |
| 2003/0172127 A1 | 9/2003 | Northrup et al. | |
| 2003/0187939 A1 * | 10/2003 | O'Brien | H04L 51/18 709/206 |
| 2003/0200268 A1 | 10/2003 | Morris | |
| 2004/0015610 A1 | 1/2004 | Treadwell | |
| 2004/0024754 A1 | 2/2004 | Mane et al. | |
| 2004/0044727 A1 | 3/2004 | Abdelaziz et al. | |
| 2004/0064478 A1 | 4/2004 | Canesi | |
| 2004/0064511 A1 | 4/2004 | Abdel-Aziz et al. | |
| 2004/0088347 A1 | 5/2004 | Yeager et al. | |
| 2004/0117456 A1 | 6/2004 | Brooks | |
| 2004/0158607 A1 * | 8/2004 | Coppinger | G06Q 10/107 709/206 |
| 2004/0186894 A1 | 9/2004 | Jhingan et al. | |
| 2005/0010646 A1 | 1/2005 | Shiina | |
| 2005/0102348 A1 * | 5/2005 | Parsons | G06Q 10/107 709/201 |
| 2005/0114664 A1 | 5/2005 | Davin | |
| 2005/0114671 A1 | 5/2005 | Little et al. | |
| 2005/0198149 A1 * | 9/2005 | Johnson, II | H04L 12/58 709/206 |
| 2005/0223073 A1 | 10/2005 | Malik | |
| 2006/0069787 A1 | 3/2006 | Sinclair et al. | |
| 2006/0095531 A1 | 5/2006 | Cho | |
| 2006/0168012 A1 * | 7/2006 | Rose | H04L 67/104 709/206 |
| 2006/0224583 A1 | 10/2006 | Fikes et al. | |
| 2006/0224608 A1 | 10/2006 | Zamir et al. | |
| 2006/0224615 A1 | 10/2006 | Korn et al. | |
| 2006/0224624 A1 | 10/2006 | Korn et al. | |
| 2006/0224938 A1 | 10/2006 | Fikes et al. | |
| 2006/0256934 A1 | 11/2006 | Mazor | |
| 2007/0067726 A1 | 3/2007 | Flynt et al. | |
| 2007/0078902 A1 | 4/2007 | Buschi et al. | |
| 2007/0100713 A1 | 5/2007 | Favero et al. | |
| 2007/0180150 A1 | 8/2007 | Eisner et al. | |
| 2007/0203917 A1 * | 8/2007 | Du | H04L 29/06 |
| 2008/0005103 A1 | 1/2008 | Ratcliffe et al. | |
| 2008/0016160 A1 | 1/2008 | Walter et al. | |
| 2008/0046807 A1 * | 2/2008 | Margitich | G06Q 10/107 715/222 |
| 2008/0059500 A1 | 3/2008 | Symens | |
| 2008/0098075 A1 | 4/2008 | Bryan et al. | |
| 2008/0155110 A1 | 6/2008 | Morris | |
| 2008/0201364 A1 | 8/2008 | Buschi et al. | |
| 2008/0256199 A1 | 10/2008 | Pesala | |
| 2008/0320094 A1 | 12/2008 | Tu et al. | |
| 2009/0157829 A1 | 6/2009 | Choi et al. | |
| 2009/0157859 A1 | 6/2009 | Morris | |
| 2009/0177526 A1 | 7/2009 | Aaltonen et al. | |
| 2009/0222450 A1 | 9/2009 | Zigelman | |
| 2009/0254601 A1 | 10/2009 | Moeller et al. | |
| 2009/0265426 A1 | 10/2009 | Svendsen et al. | |
| 2009/0271492 A1 * | 10/2009 | Fein | G06F 17/30017 709/212 |
| 2009/0327904 A1 | 12/2009 | Guzak et al. | |
| 2010/0011077 A1 * | 1/2010 | Shkolnikov | H04L 51/063 709/206 |
| 2010/0049608 A1 * | 2/2010 | Grossman | G06Q 30/02 705/14.55 |
| 2010/0070602 A1 | 3/2010 | Malik | |
| 2010/0169442 A1 | 7/2010 | Liu et al. | |
| 2010/0235439 A1 | 9/2010 | Goodnow | |
| 2010/0312782 A1 | 12/2010 | Li et al. | |
| 2011/0072033 A1 | 3/2011 | White et al. | |
| 2011/0138004 A1 | 6/2011 | McConn et al. | |
| 2011/0276637 A1 | 11/2011 | Thornton et al. | |
| 2012/0011207 A1 | 1/2012 | Morris | |
| 2012/0011444 A1 | 1/2012 | Morris | |
| 2012/0226561 A1 * | 9/2012 | Sinn | G06Q 10/107 705/14.66 |
| 2013/0046992 A1 | 2/2013 | Resch et al. | |
| 2013/0103835 A1 * | 4/2013 | Yotsutani | G06F 9/4887 709/225 |
| 2014/0089419 A1 | 3/2014 | Morris | |
| 2014/0089420 A1 | 3/2014 | Morris | |
| 2014/0089421 A1 | 3/2014 | Morris | |
| 2014/0108487 A1 | 4/2014 | Rosset et al. | |

(56) References Cited

U.S. PATENT DOCUMENTS

2014/0112319 A1 4/2014 Morris
2014/0172999 A1 6/2014 Morris
2014/0279050 A1 9/2014 Makar et al.

OTHER PUBLICATIONS

Crocker, D, "Standard for the Format of ARPA Internet Text Messages", RFC 822, pp. 1-47, Aug. 1982, Internet Engineering Task Force (IEFT), http://www.ietf.org/rfc/rfc822.txt.
Fielding, R, et al, "Hypertext Transfer Protocol—HTIP/1.1", RFC 2616, pp. 1-114, Jun. 1999, Internet Engineering Task Force (IEFT), http://www.ietf.org/rfc/rfc2616.txt.
Freed, N, et al, "Multipurpose Internet Mail Extensions (MIME) Part 1: Format of Internet Message Bodies", RFC 2045, pp. 1-31, Nov. 1996, Internet Engineering Task Force (IEFT), http://www.ietf.org/rfc/rfc2045.txt.
Hoffman, P, et al, "The mailto URL scheme", RFC 2368, pp. 1-10, Jul. 1998, Internet Engineering Task Force (IE FT), http://fwww.ietf.org/rfc/rfc2368. txt.
Klensin, J, "Simple Mail Transfer Protocol", RFC 5321, pp. 1-95, Oct. 2008, Internet Engineering Task Force (IEFT), http://www.ietf.org/rfc/rfc5321.txt.
Myers, J, et al, "Post Office Protocol—version 3", RFC 1939, pp. 1-23, May 1996, Internet Engineering Task Force (IEFT), http://www.ietf.org/rfc/rfc1939.txt.
O. S. Goh, C. C. Fung and K. W. Wong, "VisualChat: A Visualization Tool for Human-Machine Interaction," 2008 IEEE/WIC/ACM International Conference on Web Intelligence and Intelligent Agent Technology, Sydney, NSW, 2008, pp. 131-134, available at http://ieeexplore.ieee.org/document/4740744/?reload=true.

Press Release, "Amazon.com Launches "Amazon TextBuyIt," Making It Fast and Easy for Customers to Shop and Buy on Amazon.com Using Text Messages", Amazon, Apr. 2, 2008, available at http://phx.corporate-ir.net/phoenix.zhtml?c=1760608p=irol-newsArticle&ID=1124741.
Press Release, "Premier wireless operator in the US selects eGain virtual assistant technology to provide innovative, multilingual customer self-service" eGain, Oct. 6, 2011, available at http://www.egain.com/company/news/press_releases_2011/premier-wireless-operator-in-the-us-selects-egain-virtual-assistant-technology-to-provide-innovative-multilingual-customer-self-service/.
Resnick, E, "Internet Message Format", RFC 5322, pp. 1-57, Oct. 2008, Internet Engineering Task Force (IEFT), http://www.ietf.org/rfc/rfc5322.txt.
Richardson T, et al, "The Remote Framebuffer Protocol", RFC 6143, pp. 1-39, Mar. 2011, Internet Engineering Task Force (IEFT), http://www.ietf.org/rfc/rfc6143.txt.
Rosenberg, J, et al, "SIP: Session Initiation Protocol", RFC 3261, pp. 1-269, Jun. 2002, Internet Engineering Task Force (IEFT), http://www.ietf.org/rfc/rfc3261.txt.
Rothman, Wilson "Amazon "Simple" TextBuyIt Text-Message Shopping Sounds Complicated", Gizmodo, Apr. 2, 2008, available at https://gizmodo.com/375115/amazon-simple-textbuyit-text-message-shopping-sounds-complicated.
Simonite, Tom, "Shopping via Text Message," MIT Technology Review, Business Report, Nov. 23, 2010, available at https://www.technologyreview.com/s/421784/shopping-via-text-message/.
Website Page, "Sending video via text message", Android Central, Jan. 26, 2014, available at https://forums.androidcentral.com/motorola-droid-x/46718-sending-video-via-text-message.html.
Wilde, E, et al, "URI Scheme for Global System for Mobile Communications (GSM) Short Message Service", RFC 5724, pp. 1-18, Jan. 2010, Internet Engineering Task Force (IEFT), http://www.ietf.org/rfc/rfc5724.txt.

* cited by examiner

900a

MIME-Version: 1.0
Content-Type: multipart/mixed; boundary="--OoOT----toOo--------"

--OoOT----toOo--------
Content-Type: text/plain
Hi, this is the first message
--OoOT----toOo--------
Content-Type: application/attachment-query
Accept: image/*
<attachment-query>
 <and>
  <criterion attribute="content" type="regex" match-value="[0-9]{3,3}[A-Za-z]+" />
  <criterion attribute="name" type="fileex" match-value="2010*.xlsx" />
  <criterion attribute="owner" type="stringex" match-value="J. J. Cash" />
  <criterion attribute="modified" type="dateex" match-value="20100514,30d" />
  <criterion attribute="created" type="dateex" match-value="2008001,current" />
  <criterion attribute="tag" type="string" match-value="IT, hardware" />
 </and>
</attachment-query>
--OoOT----toOo--------

MIME-Version: 1.0
Content-Type: multipart/mixed; boundary="--toOo----OoOt--------"

--toOo----OoOt--------
Content-Type: text/plain
--toOo----OoOt--------
Content-Type: image/png Content-Transfer-Encoding: base64

PGh0bWw--CiAgPGhlYWQ--CiAgPC9oZWFkPgogIDxib2R5Pgog
ICAgPHA--VGhpcyBpcyB0aGUgYm9keSBvZiB0aGUgbWVzc2Fn
ZS48L3A--CiAgPC9ib2R5Pgo8L2h0bWw+Cg== . . .
--toOo----OoOt--------

MIME-Version: 1.0
Content-Type: multipart/mixed; boundary="--toOo----OoOt--------"

--toOo----OoOt--------- ⟵ 1708a
Content-Type: text/plain

Here's the first draft. See attached.      1706a

JJ
--toOo----OoOt---------

1704a ⟶ Content-Type: image/jpeg ⟵ 1710a

Content-Accessor: jj@somemail.net; Aj347W4

Content-Transfer-Encoding: base64                                1702a

PGh0bWw+CiAgPGhlYWQ+CiAgPC9oZWFkPgogIDxib2R5Pgog
ICAgPHA+VGhpcyBpcyB0aGUgYm7keSBvZiB0aGUgbWVzc2Fn
ZS48L3A+CiAgPC9ib2R5Pgo8L2h0bWw
--toOo----OoOt---------

Fig. 16a

METHODS, SYSTEMS, AND COMPUTER PROGRAM PRODUCTS FOR PROCESSING A REQUEST FOR A RESOURCE IN A COMMUNICATION

RELATED APPLICATIONS

This application is a continuation-in-part of, and claims priority to U.S. patent application Ser. No. 15/803,733 filed Nov. 3, 2017 entitled "METHODS AND COMPUTER PROGRAM PRODUCTS FOR PROCESSING A SEARCH" which in turn is a continuation-in-part of, and claims priority to U.S. patent application Ser. No. 14/835,662 filed Aug. 25, 2015 entitled "METHODS, SYSTEMS, AND COMPUTER PROGRAM PRODUCTS FOR CONTROLLING PLAY OF MEDIA STREAMS" which in turn is a continuation-in-part of, and claims priority to U.S. patent application Ser. No. 13/867,040, entitled "METHODS, SYSTEMS, AND COMPUTER PROGRAM PRODUCTS FOR PROCESSING A REQUEST FOR A RESOURCE IN A COMMUNICATION," filed Apr. 20, 2013 which in turn is a continuation of U.S. patent application Ser. No. 12/833,014 entitled "METHODS, SYSTEMS, AND COMPUTER PROGRAM PRODUCTS FOR PROCESSING A REQUEST FOR A RESOURCE IN A COMMUNICATION" filed Jul. 9, 2010 which in turn incorporates by reference application Ser. No. 12/833,016 (published as US2012-0011444) filed on 2010 Jul. 9, entitled "Methods, Systems, and Program Products for Referencing an Attachment in a Communication."

The present application is also a continuation-in-part of and claims priority to U.S. application Ser. No. 15/803,822 filed Nov. 5, 2017 and entitled "METHODS AND COMPUTER PROGRAM PRODUCTS FOR PROCESSING A SEARCH" which in turn is a continuation-in-part of and claims priority to U.S. application Ser. No. 15/800,033 filed Oct. 31, 2017 and entitled "METHODS, SYSTEMS, AND COMPUTER PROGRAM PRODUCTS FOR PROCESSING A DATA OBJECT IDENTIFICATION REQUEST IN A COMMUNICATION" which in turn is a continuation-in-part of and claims priority to: U.S. application Ser. No. 14/274,623 filed May 9, 2014 and entitled "METHODS, SYSTEMS, AND COMPUTER PROGRAM PRODUCTS FOR PROCESSING A DATA OBJECT IDENTIFICATION REQUEST IN A COMMUNICATION" which in turn is a continuation-in-part of and claims priority to: U.S. application Ser. No. 13/654,647 (published as US 2014-0112319 A1) filed Oct. 18, 2012 and entitled "METHODS, SYSTEMS, AND COMPUTER PROGRAM PRODUCTS FOR CONSTRAINING A DATA EXCHANGE REQUESTED IN A COMMUNICATION," U.S. application Ser. No. 13/716,156 (published as US 2014-0172912 A1) filed Dec. 16, 2012 and entitled "METHODS, SYSTEMS, AND COMPUTER PROGRAM PRODUCTS FOR PROCESSING A SEARCH QUERY EXCHANGED VIA A COMMUNICATIONS PROTOCOL," and U.S. application Ser. No. 13/716,159 (published as US 2014-0172998 A1) filed Dec. 16, 2012 and entitled "METHODS, SYSTEMS, AND COMPUTER PROGRAM PRODUCTS FOR BROWSING VIA A COMMUNICATIONS AGENT," where U.S. application Ser. No. 13/716,159 incorporates the following applications by reference:

application Ser. No. 13/716,156 (published as US 2014-0172912 A1) filed on 2012 Dec. 16, entitled "METHODS, SYSTEMS, AND PROGRAM PRODUCTS FOR PROCESSING A SEARCH QUERY VIA A COMMUNICATIONS PROTOCOL";

application Ser. No. 13/716,160 (published as US 2014-0172999 A1) filed on 2012 Dec. 16, entitled "METHODS, SYSTEMS, AND PROGRAM PRODUCTS FOR ACCESSING A SERVICE VIA A PROXY COMMUNICATIONS AGENT";

application Ser. No. 13/716,158 (published as US 2014-0173449 A1) filed on 2012 Dec. 16, entitled "METHODS, SYSTEMS, AND PROGRAM PRODUCTS FOR PROCESSING A REQUEST VIA A COMMUNICATIONS AGENT";

application Ser. No. 13/624,906 (published as US 2014-0089419 A1) filed on 2012 Sep. 22, entitled "METHODS, SYSTEMS, AND PROGRAM PRODUCTS FOR PROCESSING A DATA OBJECT REQUEST IN A COMMUNICATION";

application Ser. No. 13/626,635 (published as US 2014-0089421 A1) filed on 2012 Sep. 25, entitled "METHODS, SYSTEMS, AND PROGRAM PRODUCTS FOR SHARING A DATA OBJECT IN A DATA STORE VIA A COMMUNICATION";

application Ser. No. 13/647,144 (published as US 2014-0101554 A1) filed on 2012 Oct. 8, entitled "METHODS, SYSTEMS, AND PROGRAM PRODUCTS FOR EXCHANGING PRESENTATION DATA IN A COMMUNICATION";

application Ser. No. 13/624,940 (published as US 2014-0089420 A1) filed on 2012 Sep. 23, entitled "Methods, Systems, and Program Products for Processing a Reference in a Communication to a Remote Data Object"; and application Ser. No. 13/654,647 (published as US 2014-0112319 A1) filed on 2012 Oct. 18, entitled "METHODS, SYSTEMS, AND PROGRAM PRODUCTS FOR CONSTRAINING A DATA EXCHANGE REQUEST IN A COMMUNICATION", and where U.S. application Ser. No. 13/654,647 incorporates the following applications by reference:

application Ser. No. 12/833,014 (published as US 2012-0011207 A1) filed on 2010 Jul. 9, entitled "METHODS, SYSTEMS, AND PROGRAM PRODUCTS FOR PROCESSING A REQUEST FOR A RESOURCE IN A COMMUNICATION;" and application Ser. No. 12/833,016 (published as US 2012-0011444 A1) filed on 2010 Jul. 9, entitled "METHODS, SYSTEMS, AND PROGRAM PRODUCTS FOR REFERENCING AN ATTACHMENT IN A COMMUNICATION".

The following applications are incorporated herein by reference:

U.S. application Ser. No. 13/716,159 (published as US 2014-0172998 A1) filed Dec. 16, 2012 and entitled "METHODS, SYSTEMS, AND COMPUTER PROGRAM PRODUCTS FOR BROWSING VIA A COMMUNICATIONS AGENT;"

application Ser. No. 13/716,156 (published as US 2014-0172912 A1) filed on 2012 Dec. 16, entitled "METHODS, SYSTEMS, AND PROGRAM PRODUCTS FOR PROCESSING A SEARCH QUERY VIA A COMMUNICATIONS PROTOCOL";

application Ser. No. 13/716,160 (published as US 2014-0172999 A1) filed on 2012 Dec. 16, entitled "METHODS, SYSTEMS, AND PROGRAM PRODUCTS FOR ACCESSING A SERVICE VIA A PROXY COMMUNICATIONS AGENT";

application Ser. No. 13/716,158 (published as US 2014-0173449 A1) filed on 2012 Dec. 16, entitled "METHODS, SYSTEMS, AND PROGRAM PRODUCTS FOR PROCESSING A REQUEST VIA A COMMUNICATIONS AGENT";

application Ser. No. 13/624,906 (published as US 2014-0089419 A1) filed on 2012 Sep. 22, entitled "METHODS, SYSTEMS, AND PROGRAM PRODUCTS FOR PROCESSING A DATA OBJECT REQUEST IN A COMMUNICATION";

application Ser. No. 13/626,635 (published as US 2014-0089421 A1) filed on 2012 Sep. 25, entitled "METHODS, SYSTEMS, AND PROGRAM PRODUCTS FOR SHARING A DATA OBJECT IN A DATA STORE VIA A COMMUNICATION";

application Ser. No. 13/647,144 (published as US 2014-0101554 A1) filed on 2012 Oct. 8, entitled "METHODS, SYSTEMS, AND PROGRAM PRODUCTS FOR EXCHANGING PRESENTATION DATA IN A COMMUNICATION";

application Ser. No. 13/624,940 (published as US 2014-0089420 A1) filed on 2012 Sep. 23, entitled "Methods, Systems, and Program Products for Processing a Reference in a Communication to a Remote Data Object";

application Ser. No. 13/654,647 (published as US 2014-0112319 A1) filed on 2012 Oct. 18, entitled "METHODS, SYSTEMS, AND PROGRAM PRODUCTS FOR CONSTRAINING A DATA EXCHANGE REQUEST IN A COMMUNICATION";

application Ser. No. 12/833,014 (published as US 2012-0011207 A1) filed on 2010 Jul. 9, entitled "METHODS, SYSTEMS, AND PROGRAM PRODUCTS FOR PROCESSING A REQUEST FOR A RESOURCE IN A COMMUNICATION;" and application Ser. No. 12/833,016 (published as US 2012-0011444 A1) filed on 2010 Jul. 9, entitled "METHODS, SYSTEMS, AND PROGRAM PRODUCTS FOR REFERENCING AN ATTACHMENT IN A COMMUNICATION".

BACKGROUND

While receiving attachments in network communication, such as email, is common, most attachments received are unsolicited or unrequested. To request a resource in an attachment, a user typically sends the request as voice and/or text data in a voice and/or text message heard and/or read by another user. The request may be as vague or as specific as the language used by the requesting user. The other user must interpret the request and find a resource that seems to match the request. The other user in many cases locates a "matching" resource using a program or application other than the communications agent that received the request. For example, a search program may be used to search a hard-drive by the other user. The other user must enter the search criteria.

Accordingly, there exists a need for methods, systems, and computer program products for processing a request for a resource in a communication.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one embodiment, a computer-implemented method is provided, comprising: creating at least a portion of an instant messaging network service application that is configured to cooperate with a device including a touchscreen and a client instant messaging application, the client instant messaging application, when executed, is configured to cause the device to: display, via the touchscreen, an instant messaging interface including a text entry user interface element for receiving entered text, and one or more user interface elements for causing requests to be sent that are valid according to a criterion schema defining at least one of a format or a vocabulary, the one or more user interface elements including a first menu item with corresponding first text, wherein the instant messaging network service application, when executed, is configured to cause an apparatus to: based on a touch selection on the first menu item with corresponding first text: receive, at the apparatus from the device and with a communicant identifier associated with a user of the client instant messaging application, a first request that is valid according to the criterion schema defining at least one of the format or the vocabulary, after receiving, at the apparatus from the device and with the communicant identifier associated with the user of the client instant messaging application, the first request that is valid according to the criterion schema defining at least one of the format or the vocabulary: send, from the apparatus to the device and with the communicant identifier associated with the user of the client instant messaging application, a first response for causing display, via the instant messaging interface, of at least one first image that is automatically identified by the apparatus based on the first request, based on entry, via the text entry user interface element of the instant messaging interface, of the entered text: receive, at the apparatus from the device and with the communicant identifier associated with the user of the client instant messaging application, a second request that is valid according to the criterion schema defining at least one of the format or the vocabulary, and after receiving, at the apparatus from the device and with the communicant identifier associated with the user of the client instant messaging application, the second request that is valid according to the criterion schema defining at least one of the format or the vocabulary: send, from the apparatus to the device and with the communicant identifier associated with the user of the client instant messaging application, a second response for causing display, via the instant messaging interface, of content that is automatically identified by the apparatus based on the second request; and causing storage of the at least portion of the instant messaging network service application.

In another embodiment, a computer-implemented method is provided, comprising: creating at least a portion of a client instant messaging application that is configured to be installed on a touchscreen-equipped device for cooperation with an apparatus, the client instant messaging application, when executed, configured to cause the device to: display an instant messaging interface including: a text entry user interface element for receiving entered text, and one or more user interface elements for causing one or more requests to be sent that are valid according to a criterion schema defining at least one of a format or a vocabulary, the one or more user interface elements including a first menu item with corresponding first text, where the first menu item is conditionally displayed based on a receipt of a signal from the apparatus via at least one network; creating at least a portion of an instant messaging network service application that is configured to be installed on the apparatus for cooperation with the device with the client instant messaging application installed thereon, wherein the client instant messaging application and the instant messaging network service application, when executed, are configured to cause the apparatus and the device to cooperate to: based on a selection on the first menu item with corresponding first text, send, from the device to the apparatus and with a communicant identifier associated with a user of the client instant messaging application, a first request that is valid according to the criterion schema defining at least one of the format or the vocabulary, receive, at the apparatus from the device and with the communicant identifier associated with the user of the client instant messaging application, the first request that is valid according to the criterion schema defining at least one of the format or the vocabulary, after receiving, at the apparatus from the device and with the communicant identifier associated with the user of the client instant messaging application, the first request that is valid according to the criterion schema defining at least one of the format or the vocabulary: send, from the apparatus to the device and with the communicant identifier associated with the user of the client instant messaging application, a first response, and receive, at the device from the apparatus and with the communicant identifier associated with the user of the client instant messaging application, the first response for causing display, via the instant messaging interface, of at least one first image that is automatically identified by the apparatus based on the first request; causing storage of the at least portion of the instant messaging network service application; and causing storage of the at least portion of the client instant messaging application.

In yet another embodiment, a computer-implemented method is provided, comprising: creating at least a portion of a client instant messaging application that is configured to be installed on a touchscreen-equipped device for cooperation with an apparatus, the client instant messaging application, when executed, configured to cause the device to: display an instant messaging interface including: a text entry user interface element for receiving entered text, and one or more user interface elements for causing one or more requests to be sent that are valid according to a criterion schema defining at least one of a format or a vocabulary, the one or more user interface elements including a first menu item with corresponding first text, where the first menu item is conditionally displayed based on a receipt of a signal from the apparatus via at least one network; creating at least a portion of an instant messaging network service application that is configured to be installed on the apparatus for cooperation with the device with the client instant messaging application installed thereon, wherein the client instant messaging application and the instant messaging network service application, when executed, are configured to cause the apparatus and the device to cooperate to: based on receipt of the entered text from a user, send, from the device to the apparatus and with a communicant identifier associated with the user of the client instant messaging application, a first request that is valid according to the criterion schema defining at least one of the format or the vocabulary, receive, at the apparatus from the device and with the communicant identifier associated with the user of the client instant messaging application, the first request that is valid according to the criterion schema defining at least one of the format or the vocabulary, after receiving, at the apparatus from the device and with the communicant identifier associated with the user of the client instant messaging application, the first request that is valid according to the criterion schema defining at least one of the format or the vocabulary: send, from the apparatus to the device and with the communicant identifier associated with the user of the client instant messaging application, a first response, and receive, at the device from the apparatus and with the communicant identifier associated with the user of the client instant messaging application, the first response, for causing display, via the instant messaging interface, of at least one first image that is automatically identified by the apparatus based on the first request; causing storage of the at least portion of the instant messaging network service application; and causing storage of the at least portion of the client instant messaging application.

In other embodiments, other methods and/or non-transitory media are provided which may omit one or more of the features disclosed in the above embodiment.

In still other embodiments, methods and systems are described for processing a request for a resource in a communication. In one aspect, the method includes receiving a resource criterion for a requesting a resource via a first communication including a message portion including a first message addressed to a first user represented by a first node. The method further includes sending, via a network to the first node, the first communication including a request portion that includes an attachment request based on the resource criterion. The method still further includes receiving, by a second node representing a second user, a second communication including, based on the request portion, the resource, as an attachment, and a second message addressed to the second user.

Further, a system for processing a request for a resource in a communication is described. The system includes an execution environment including an instruction-processing unit configured to process an instruction included in at least one of a criterion handler component, a query generator component, and a content manager component. The system includes the criterion handler component configured for receiving a resource criterion for a requesting a resource via a first communication including a message portion including a first message addressed to a first user represented by a first node. The system further includes the query generator component configured for sending, via a network to the first node, the first communication including a request portion that includes an attachment request based on the resource criterion. The system still further includes the content manager component configured for receiving, by a second node representing a second user, a second communication including, based on the request portion, the resource, as an attachment, and a second message addressed to the second user.

In another aspect, a method for processing a request for a resource in a communication is described that includes receiving, via a network by a first node, a first communication including a first message addressed to a first user. The method further includes detecting, by the first node, an attachment request included in the first communication. The method still further includes locating a resource based on the attachment request. The method also includes sending, to a second node, a second communication including the located resource, as an attachment, and including a second message addressed to a second user.

Still further, a system for processing a request for a resource in a communication is described. The system includes an execution environment including an instruction-processing unit configured to process an instruction included in at least one of a com-in component, a query content handler component, a resource location component, and an access director component. The system includes the com-in component configured for receiving, via a network by a first node, a first communication including a first message addressed to a first user. The system further includes the query content handler component configured for detecting, by the first node, an attachment request included in the first communication. The system still further includes the resource location component configured for locating a resource based on the attachment request. The system also includes the access director component configured for sending, to a second node, a second communication including the located resource, as an attachment, and including a second message addressed to a second user.

BRIEF DESCRIPTION OF THE DRAWINGS

Objects and advantages of the present invention will become apparent to those skilled in the art upon reading this description in conjunction with the accompanying drawings, in which like reference numerals have been used to designate like or analogous elements, and in which:

FIG. 9a illustrates an exemplary communication between a first node and a second node according to an aspect of the subject matter described herein; and FIG. 9b illustrates an exemplary communication between a first node and a second node according to an aspect of the subject matter described herein.

FIG. 16a illustrates an exemplary communication between a first node and a second node according to an aspect of the subject matter described herein.

DETAILED DESCRIPTION

Figure 1:
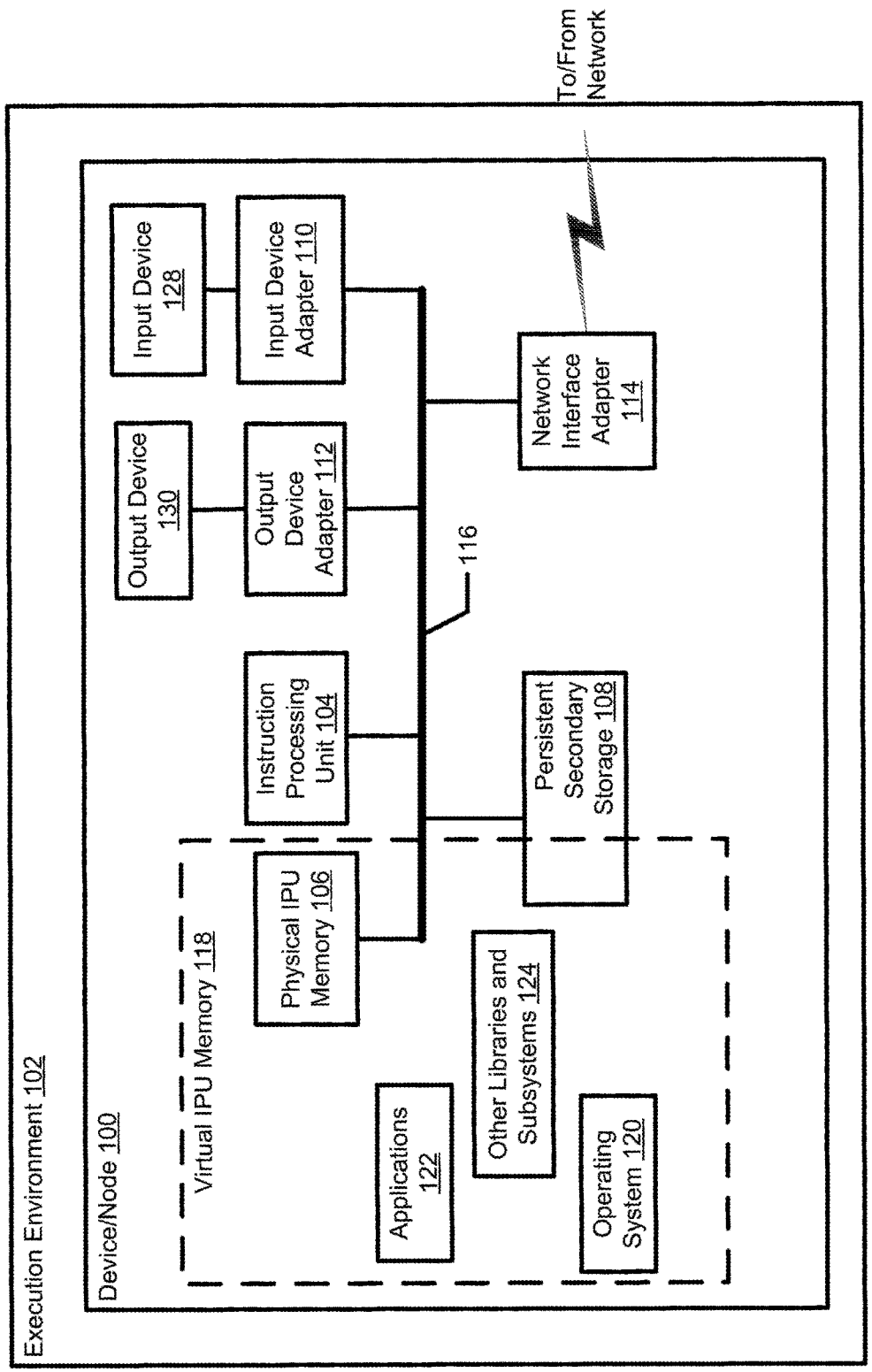
FIG. 1 is a block diagram illustrating an exemplary hardware device included in and/or otherwise providing an execution environment in which the subject matter may be implemented.

One or more aspects of the disclosure are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of the disclosure. It may be evident, however, to one skilled in the art that one or more aspects of the disclosure may be practiced with a lesser degree of these specific details. In other instances, well-known structures and devices are shown in block diagram form in order to facilitate describing one or more aspects of the disclosure.

An exemplary device included in an execution environment that may be configured according to the subject matter is illustrated in FIG. 1. An execution environment includes an arrangement of hardware and, optionally, software that may be further configured to include an arrangement of components for performing a method of the subject matter described herein. An execution environment includes and/or is otherwise provided by one or more devices. An execution environment may include a virtual execution environment including software components operating in a host execution environment. Exemplary devices included in or otherwise providing suitable execution environments for configuring according to the subject matter include personal computers, notebook computers, tablet computers, servers, handheld and other mobile devices, multiprocessor devices, distributed devices, consumer electronic devices, routers, communication servers, and/or other network-enabled devices. Those skilled in the art will understand that the components illustrated in FIG. 1 are exemplary and may vary by particular execution environment.

FIG. 1 illustrates hardware device 100 included in execution environment 102. FIG. 1 illustrates that execution environment 102 includes instruction-processing unit (IPU) 104, such as one or more microprocessors; physical processor memory 106 including storage locations identified by addresses in a physical memory address space of IPU 104; persistent secondary storage 108, such as one or more hard drives and/or flash storage media; input device adapter 110, such as a key or keypad hardware, a keyboard adapter, and/or a mouse adapter; output device adapter 112, such as a display or audio adapter for presenting information to a user; a network interface component, illustrated by network interface adapter 114, for communicating via a network such as a LAN and/or WAN; and a communication mechanism that couples elements 104-114, illustrated as bus 116. Elements 104-114 may be operatively coupled by various means. Bus 116 may comprise any type of bus architecture, including a memory bus, a peripheral bus, a local bus, and/or a switching fabric.

IPU 104 is an instruction execution machine, apparatus, or device. Exemplary IPUs include one or more microprocessors, digital signal processors (DSPs), graphics processing units, application-specific integrated circuits (ASICs), and/or field programmable gate arrays (FPGAs). In the description of the subject matter herein, the terms "IPU" and "processor" are used interchangeably. IPU 104 may access machine code instructions and data via one or more memory address spaces in addition to the physical memory address space. A memory address space includes addresses identifying locations in a processor memory. The addresses in a memory address space are included in defining a processor memory. IPU 104 may have more than one processor memory. Thus, IPU 104 may have more than one memory address space. IPU 104 may access a location in a processor memory by processing an address identifying the location. The processed address may be in an operand of a machine code instruction and/or may be identified in a register or other portion of IPU 104.

FIG. 1 illustrates virtual processor memory 118 spanning at least part of physical processor memory 106 and at least part of persistent secondary storage 108. Virtual memory addresses in a memory address space may be mapped to physical memory addresses identifying locations in physical processor memory 106. An address space for identifying locations in a virtual processor memory is referred to as a virtual memory address space; its addresses are referred to as virtual memory addresses; and its processor memory is known as a virtual processor memory or virtual memory. The term "processor memory" may refer to physical processor memory 106 and/or virtual processor memory 118 depending on the context in which the term is used.

Physical processor memory 106 may include various types of memory technologies. Exemplary memory technologies include static random access memory (SRAM) and/or dynamic RAM (DRAM) including variants such as dual data rate synchronous DRAM (DDR SDRAM), error correcting code synchronous DRAM (ECC SDRAM), and/or RAMBUS DRAM (RDRAM). Physical processor memory 106 may include volatile memory as illustrated in the previous sentence and/or may include nonvolatile memory such as nonvolatile flash RAM (NVRAM) and/or ROM.

Persistent secondary storage 108 may include one or more flash memory storage devices, one or more hard disk drives, one or more magnetic disk drives, and/or one or more optical disk drives. Persistent secondary storage 108 may include removable media. The drives and their associated computer-readable storage media provide volatile and/or nonvolatile storage for computer-readable instructions, data structures, program components, and other data for execution environment 102.

Execution environment 102 may include software components stored in persistent secondary storage 108, in remote storage accessible via a network, and/or in a processor memory. FIG. 1 illustrates execution environment 102 including operating system 120, one or more applications 122, and other program code and/or data components illustrated by other libraries and subsystems 124. In an aspect, some or all software components may be stored in locations accessible to IPU 104 in a shared memory address space shared by the software components. The software components accessed via the shared memory address space are stored in a shared processor memory defined by the shared memory address space. In another aspect, a first software component may be stored in one or more locations accessed by IPU 104 in a first address space and a second software component may be stored in one or more locations accessed by IPU 104 in a second address space. The first software component is stored in a first processor memory defined by the first address space and the second software component is stored in a second processor memory defined by the second address space.

Software components typically include instructions executed by IPU 104 in a computing context referred to as a "process". A process may include one or more "threads". A "thread" includes a sequence of instructions executed by IPU 104 in a computing sub-context of a process. The terms "thread" and "process" may be used interchangeably herein when a process includes only one thread.

Execution environment 102 may receive user-provided information via one or more input devices illustrated by input device 128. Input device 128 provides input information to other components in execution environment 102 via input device adapter 110. Execution environment 102 may include an input device adapter for a keyboard, a touch screen, a microphone, a joystick, a television receiver, a video camera, a still camera, a document scanner, a fax, a phone, a modem, a network interface adapter, and/or a pointing device, to name a few exemplary input devices.

Input device 128 included in execution environment 102 may be included in device 100 as FIG. 1 illustrates or may be external (not shown) to device 100. Execution environment 102 may include one or more internal and/or external input devices. External input devices may be connected to device 100 via corresponding communication interfaces such as a serial port, a parallel port, and/or a universal serial bus (USB) port. Input device adapter 110 receives input and provides a representation to bus 116 to be received by IPU 104, physical processor memory 106, and/or other components included in execution environment 102.

Output device 130 in FIG. 1 exemplifies one or more output devices that may be included in and/or may be external to and operatively coupled to device 100. For example, output device 130 is illustrated connected to bus 116 via output device adapter 112. Output device 130 may be a display device. Exemplary display devices include liquid crystal displays (LCDs), light emitting diode (LED) displays, and projectors. Output device 130 presents output of execution environment 102 to one or more users. In some embodiments, an input device may also include an output device. Examples include a phone, a joystick, and/or a touch screen. In addition to various types of display devices, exemplary output devices include printers, speakers, tactile output devices such as motion producing devices, and other output devices producing sensory information detectable by a user.

A device included in or otherwise providing an execution environment may operate in a networked environment communicating with one or more devices via one or more network interface components. The terms "communication interface component" and "network interface component" are used interchangeably. FIG. 1 illustrates network interface adapter (NIA) 114 as a network interface component included in execution environment 102 to operatively couple device 100 to a network. A network interface component includes a network interface hardware (NIH) component and optionally a software component. The terms "network node" and "node" in this document both refer to a device having a network interface component for operatively coupling the device to a network.

Exemplary network interface components include network interface controller components, network interface cards, network interface adapters, and line cards. A node may include one or more network interface components to interoperate with a wired network and/or a wireless network. Exemplary wireless networks include a BLUETOOTH network, a wireless 802.11 network, and/or a wireless telephony network (e.g., a cellular, PCS, CDMA, and/or GSM network). Exemplary network interface components for wired networks include Ethernet adapters, Token-ring adapters, FDDI adapters, asynchronous transfer mode (ATM) adapters, and modems of various types. Exemplary wired and/or wireless networks include various types of LANs, WANs, and/or personal area networks (PANs). Exemplary networks also include intranets and internets such as the Internet.

The terms "device" and "node" as used herein respectively refer to one or more devices and nodes providing and/or otherwise included in an execution environment unless clearly indicated otherwise.

As used herein, the term "communication" refers to data for sending, sent, and/or received via a network between communicants. A communication includes a message portion addressed to a receiving communicant. A communication is sent to a communicant to present a message in the message portion to the communicant. The term "communicant" as used herein refers to a user represented in a communication. A communicant or user is represented by a "communications agent" configured to operate in an execution environment, on behalf of the represented communicant, to send data to and/or receive data from another communications agent according to a communications protocol via a network. A communications protocol defines and/or otherwise identifies an address space including communications addresses for delivering data sent in a communication from one communications agent to another.

The term "communicant alias" as used herein refers to an identifier of a communicant in a communication where the communicant alias is not a communications address included in an address space of a communications protocol for sending and/or receiving data in the communication.

Figure 2:
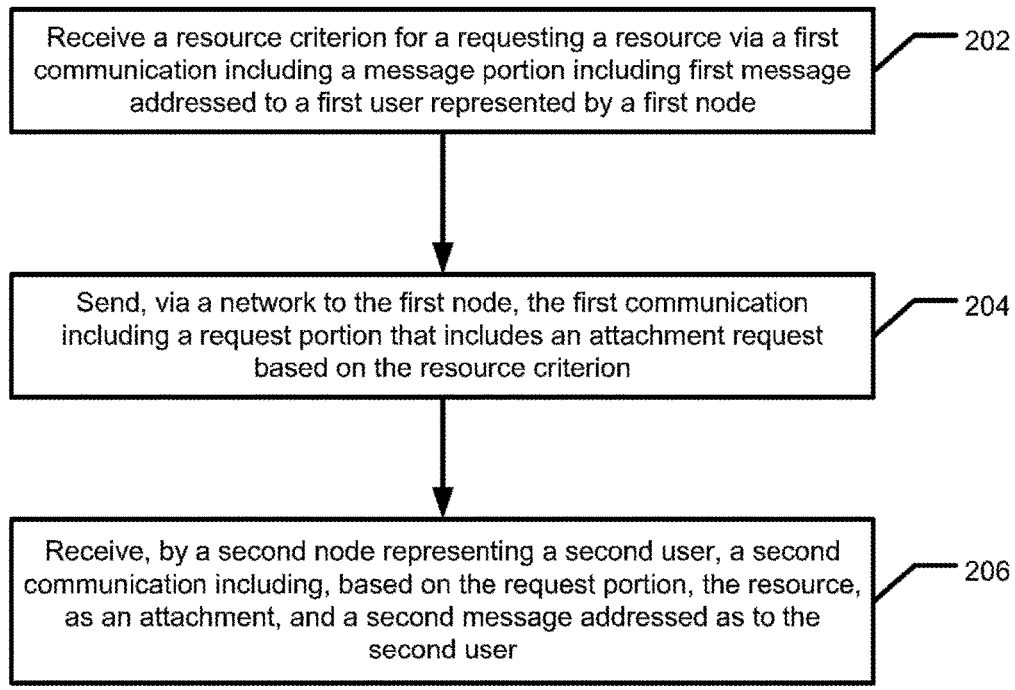
FIG. 2 is a flow diagram illustrating a method for processing a request for a resource in a communication according to an aspect of the subject matter described herein.
Figure 4A:
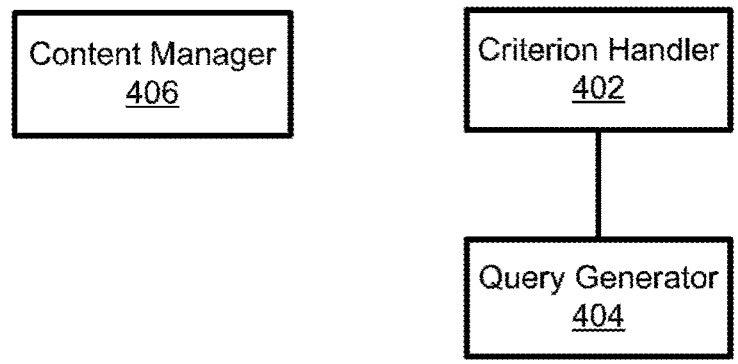
FIG. 4a is a block diagram illustrating an arrangement of components for processing a request for a resource in a communication according to another aspect of the subject matter described herein.
Figure 5:
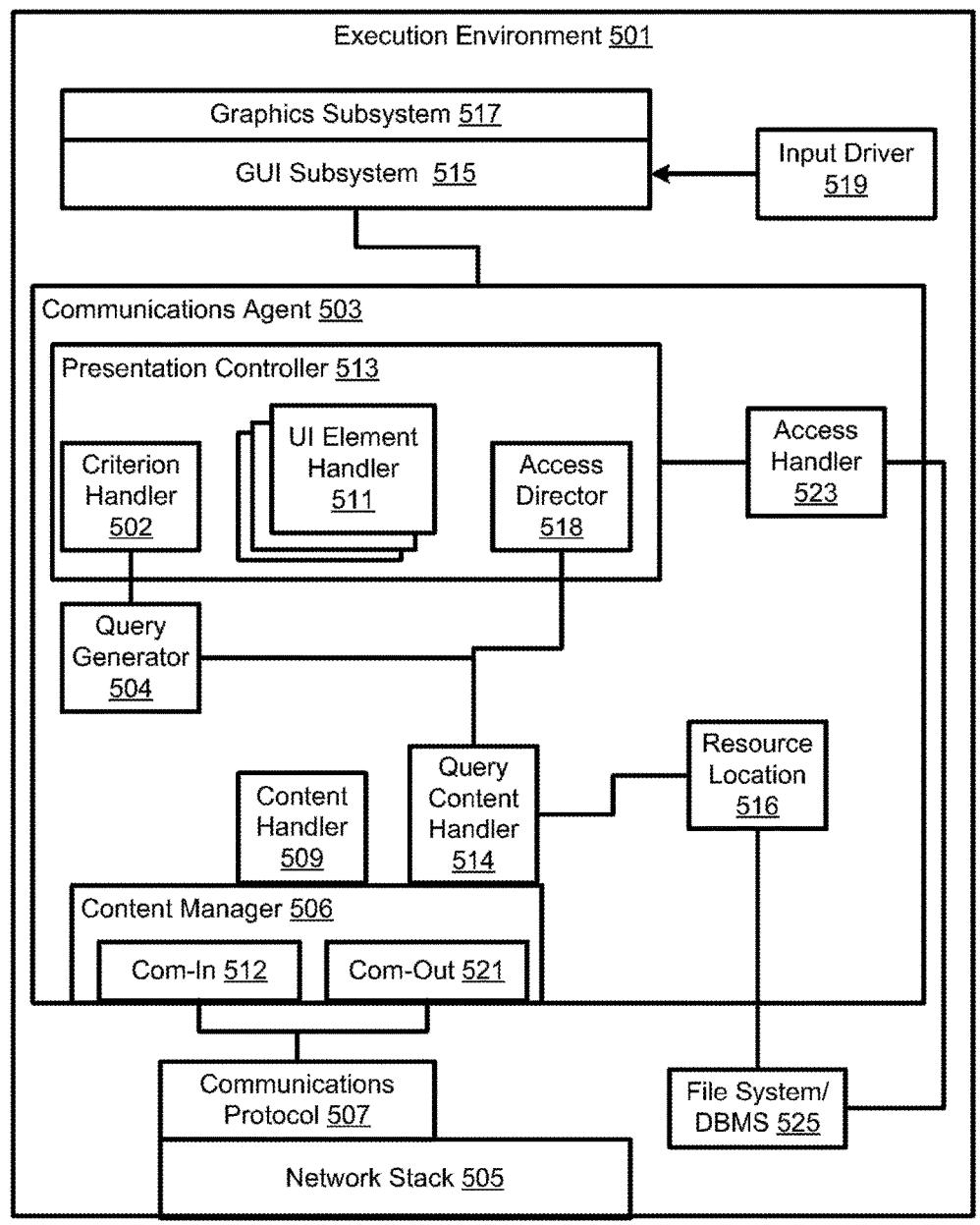
FIG. 5 is a block diagram illustrating an arrangement of components for performing a method according to another aspect of the subject matter described herein.

The block diagram in FIG. 4a illustrates an exemplary system for processing a request for a resource in a communication according to the method illustrated in FIG. 2. A system for performing the method illustrated in FIG. 2 includes an execution environment, including an instruction-processing unit, configured to process an instruction included in at least one of a criterion handler component 402, a query generator component 404, and a content manager component 406 as illustrated in FIG. 4a. Some or all of the exemplary components illustrated in FIG. 4a may be adapted for performing the method illustrated in FIG. 2 in a number of execution environments. FIG. 5 illustrates a block diagram including the components of FIG. 4a and/or analogs of the components of FIG. 4a respectively adapted for operation in execution environment 501, which includes or otherwise is provided by one or more nodes.

Figure 3:
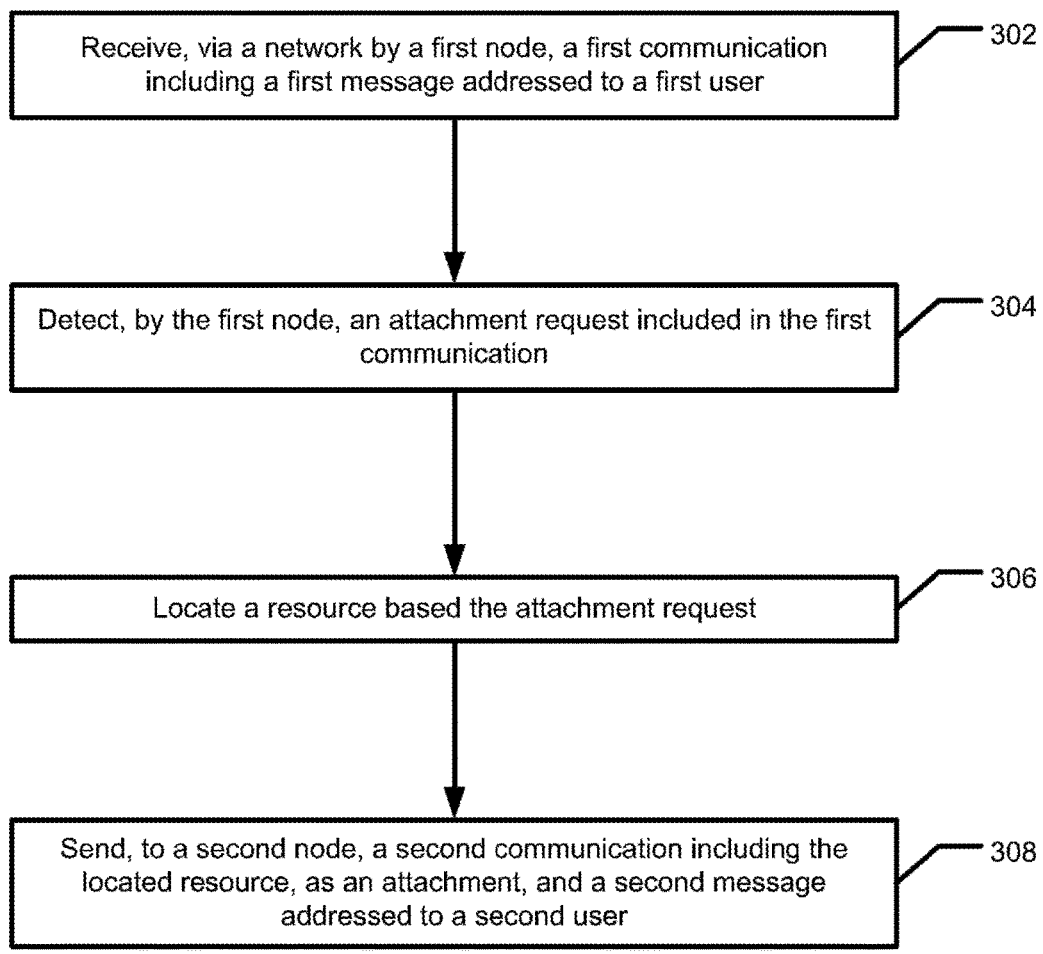
FIG. 3 is a flow diagram illustrating a method for processing a request for a resource in a communication according to an aspect of the subject matter described herein.
Figure 4B:
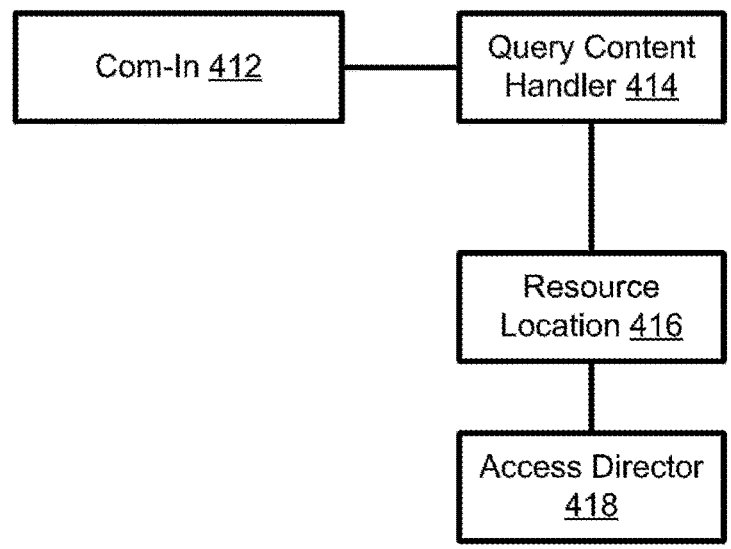
FIG. 4b is a block diagram illustrating an arrangement of components for processing a request for a resource in a communication according to another aspect of the subject matter described herein.

The block diagram in FIG. 4b illustrates an exemplary system for processing a request for a resource in a communication according to the method illustrated in FIG. 3. A system for performing the method illustrated in FIG. 3 includes an execution environment, including an instruction-processing unit, configured to process an instruction in at least one of a com-in component 412, a query content handler component 414, a resource location component 416, and an access director component 418 illustrated in FIG. 4b. Some or all of the exemplary components illustrated in FIG. 4b may be adapted for performing the method illustrated in FIG. 3 in a number of execution environments. FIG. 5 is a block diagram illustrating the components of FIG. 4b and/or analogs of the components of FIG. 4b adapted for operation in execution environment 501, which includes or otherwise is provided by one or more nodes.

FIG. 1 illustrates components of an exemplary device/node that may at least partially provide and/or otherwise be included in an execution environment. The components illustrated in FIG. 5 may be included in or otherwise combined with the components of FIG. 1 to create a variety of arrangements of components according to the subject matter described herein.

Figure 6:
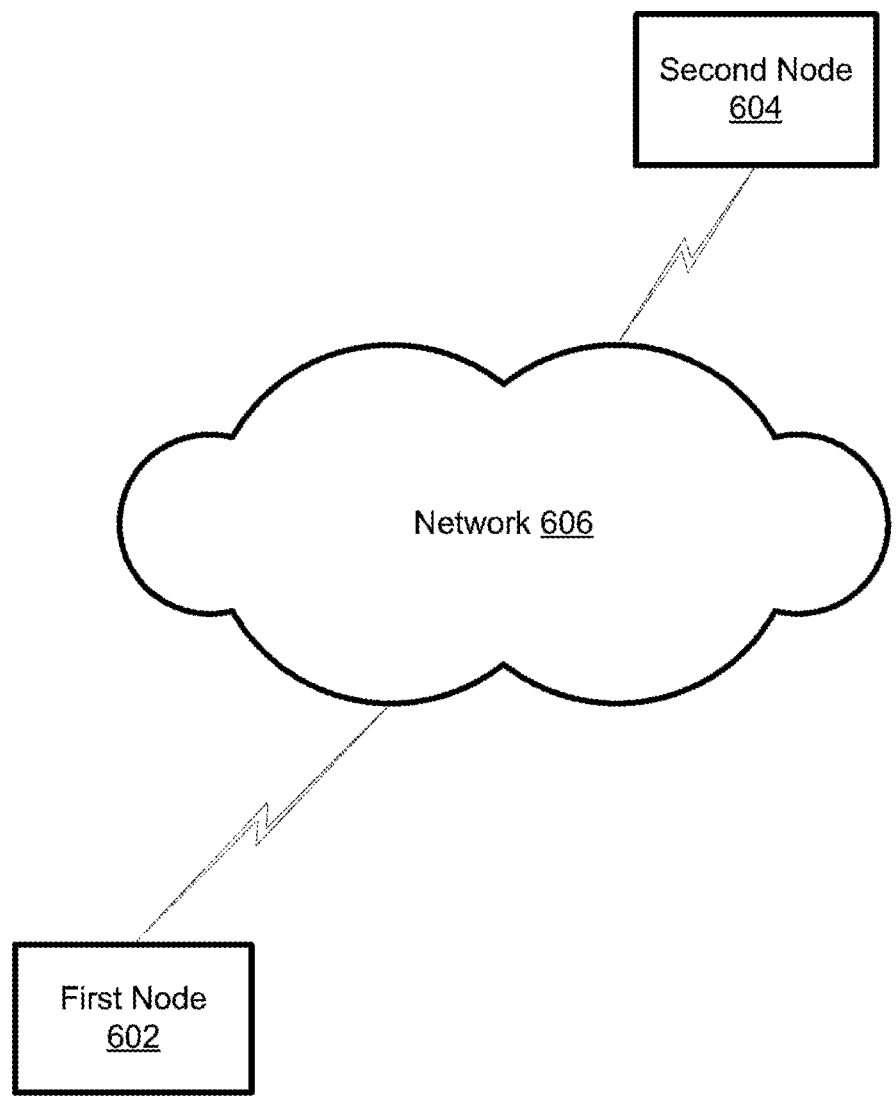
FIG. 6 is a network diagram illustrating an exemplary system for according to another aspect of the subject matter described herein.

FIG. 6 illustrates first node 602 as an exemplary device included in and/or otherwise adapted for providing an instance and/or adaptation of execution environment 501 in FIG. 5. Second node 604 also illustrates a device that may be included in and/or otherwise adapted for providing an instance and/or adaptation of execution environment 501. FIG. 6 also illustrates that first node 602 and second node 604 are operatively coupled to network 606 via respective network interface components enabling first node 602 and second node 604 to communicate.

Execution environment 501 is illustrated in FIG. 5 hosting communications agent 503. A first instance and/or analog of communications agent 503 may operate in first node 602 and a second instance and/or analog may operate in second node 604. Components in FIG. 5 are referenced for illustrative purposes in describing communications agents operating in an execution environment of first node 602 and an execution environment of second node 604. Exemplary communications agents include email clients, phone clients including Voice over Internet Protocol (VoIP) clients, instant messaging clients, multi-media communications clients including video phone clients, and other data transfer agents.

FIG. 5 illustrates communications agent 503 including an adaptation of the arrangement of components in FIG. 4a and an adaptation of the arrangement of components in FIG. 4b. A first communications agent 503 may operate, in first node 602, on behalf of a first communicant to communicate with a second communicant represented by a communications agent operating in second node 604. Another instance and/or analog of communications agent 503 may operate in an execution environment of second node 604 on behalf of the second communicant.

As stated, the various adaptations of the arrangement in FIG. 4a as well as the various adaptations of the arrangement in FIG. 4b illustrated and described herein are not exhaustive. For example, those skilled in the art will see based on the description herein that arrangements of components for performing the method illustrated in FIG. 2 and/or in FIG. 3 may be distributed across more than one node and/or execution environment. For example, such an arrangement may operate at least partially in a communications agent in a user node and at least partially in a server node interoperating with the user node.

FIG. 5 illustrates network stack 505 configured for sending and/or receiving data in a communication via network 606 in FIG. 6. First node 602 and second node 604 may be operatively coupled to network 606 via respective, network interface components. Network stacks in first node 602 and in second node 604 may support the same protocol suite, such as TCP/IP, or may communicate via a network gateway or other protocol translation device and/or service.

Communications agents 503 in FIG. 5, respectively operating in first node 602 and in second node 604 in FIG. 6 may interoperate via their respective network stacks 505. Communications agents 503 may communicate via one or more communications protocols. FIG. 5 illustrates communications protocol component 507 exemplifying a subsystem for exchanging data via network 606 according to one or more communications protocols, such as simple mail transfer protocol (SMTP), an instant messaging protocol, and/or a real-time voice and/or video protocol. A communication between communications agents 503 in first node 602 and second node 604 may include more than one type of data and may use one or more communications protocols for exchanging the one or more types of data via network 606.

Communications agents 503 in FIG. 5, in first node 602, and in second node 604, respectively, may communicate via discrete messages, a request/reply protocol, a data streaming protocol, a session and/or connection-oriented protocol, a connectionless protocol, a real-time communications protocol, an asynchronous communication, a store and forward communications protocol, a reliable delivery communications protocol, a best-effort delivery communications protocol, a secure protocol, and/or an unsecure protocol, to name a few communications options.

FIG. 5 illustrates communications agent 503 including content manager component 506. Content manager component 506 in first node 602 may interoperate with communications protocol layer component 507 and/or network stack 505 to receive data in one or more communications via network 606 with second node 604. Content manager component 506 includes and/or otherwise interoperates with com-in component 512 operatively coupling communications agent 503 to an interface of communications protocol component 507 for receiving the data from second node 604. Second node 604 may include an adaptation or analog of communications agent 503 including an adaptation and/or analog of com-in component 512 for receiving data from first node 602 in a communication.

Data received in a communication may include one or more resources and/or content types. Exemplary content types include plain text, markup such as hypertext markup language (HTML), audio data, image data, and/or executable data. Executable data may include script instruction(s), byte code, and/or machine code. In FIG. 5, communications agent 503 includes one or more content handler components 509 to process data received according to its content type. A data type may be identified by a MIME type identifier. Exemplary content handler components 509 include a text/html content handler component for processing HTML representations; an application/xmpp-xml content handler component for processing extensible messaging and presence protocol (XMPP) streams including presence tuples, instant messages, and audio content handlers including and/or configured to retrieve suitable codices; one or more video content handler components for processing video representations of various types; and still image data content handler components for processing various image data representations. Content handler component(s) 509 process received data representations and may provide transformed data from the representations to one or more user interface element handler components 511.

User interface element handler components 511 are illustrated in presentation controller component 513 in FIG. 5. Presentation controller component 513 may manage visual, audio, and other types of output for its including application as well as receive and route detected user and other inputs to components and extensions of its including application, communications agent 503. With respect to FIG. 5, a user interface element handler component 511 may be adapted to operate at least partially in a content handler component 509 such as a text/html content handler component and/or a script content handler component. Additionally or alternatively, a user interface element handler component in execution environment 501 may be received in a communication. For example, an email may include one or more script instructions.

Figure 7A:
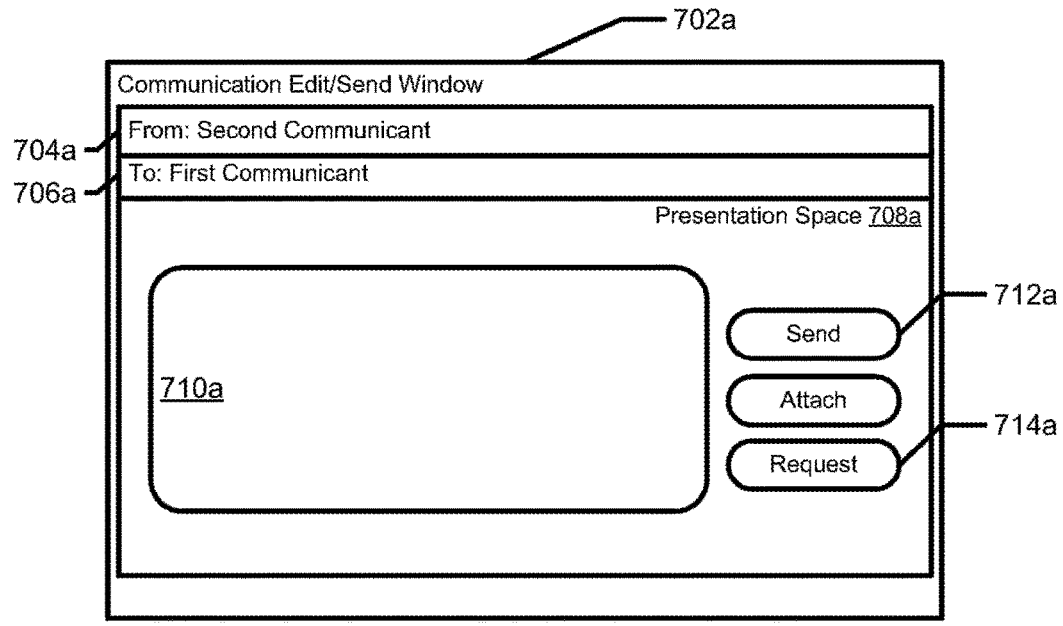
FIG. 7a is a diagram illustrating a user interface presented via a display according to another aspect of the subject matter described herein.

FIG. 7a illustrates an exemplary communication edit/send window 702a presentable in a presentation space of a display device, such as output device 130 in FIG. 1. Communication edit/send window 702a includes a sender UI element 704a for presenting a communicant identifier of a communicant represented by the communications agent presenting communication edit/send window 702a. Communication edit/send window 702a also includes a recipient UI element 706a for presenting one or more communicant identifier(s) identifying one or more communicant(s) included in the communication represented by communications agents operating in other nodes. Presentation space 708a is provided in first communication edit/send window 702a for presenting a message UI element 710a for presenting a message exchanged and/or for exchanging in the communication. FIG. 7 a also illustrates presentation space 708a including one or more communications controls for exchanging data in and/or otherwise managing the communication. Send button 712a illustrates an exemplary control for sending data in the communication to one or more identified remote communicants.

The term "attachment" as used herein refers to a portion of a communication that includes data from one communicant to another other than data in the message portion. A resource sent as an attachment is data that is typically not presented "inline" or in a message included in a message portion of a communication. Email attachments are perhaps the most widely known attachments included in communications. An email attachment is a file or other resource sent along with an email in a portion of the email separate from a message portion. As defined, other types of text communications as well as voice and video communications may include attachment portions. A communication may include one or more resources as one or more attachments.

The components of a user interface are generically referred to herein as user interface elements. More specifically, visual components of a user interface are referred to herein as visual interface elements. A visual interface element may be a visual component of a graphical user interface (GUI). Exemplary visual interface elements include windows, textboxes, sliders, list boxes, drop-down lists, spinners, various types of menus, toolbars, ribbons, combo boxes, tree views, grid views, navigation tabs, scrollbars, labels, tooltips, text in various fonts, balloons, dialog boxes, and various types of button controls including check boxes and radio buttons. An application interface may include one or more of the exemplary elements listed. Those skilled in the art will understand that this list is not exhaustive. The terms "visual representation", "visual component", and "visual interface element" are used interchangeably in this document. Other types of user interface elements include audio output components referred to as audio interface elements, tactile output components referred to as tactile interface elements, and the like.

A "user interface (UI) element handler" component, as the term is used in this document, includes a component configured to send information representing a program entity for presenting a user detectable representation of the program entity by an output device, such as a display. A "program entity" is an object included in and/or otherwise processed by an application or executable program component. The user detectable representation is presented based on the sent information. The sent information is referred to herein as "presentation information". Presentation information may include data in one or more formats including image formats such as JPEG, video formats such as MP4, markup language data such as HTML and other markup based languages, and/or instructions such as those defined by various script languages, byte code, and/or machine code. For example, a voice communication for receiving by a communications agent and/or for sending by a communications agent may be included in a media container having a specified format, such as MPEG4, and may be compressed, encrypted, and/or otherwise encoded. The data is communicated for presenting in and/or by one or more user interface elements included in a user interface of a communications agent included in the communication. Components configured to send information representing one or more program entities for presenting particular types of output by particular types of output devices include visual interface element handler components, audio interface element handler components, tactile interface element handler components, and the like.

A representation of a program entity may be presented and/or otherwise maintained in a presentation space. As used in this document, the term "presentation space" refers to a storage region allocated and/or otherwise provided for storing presentation information, which may include audio, visual, tactile, and/or other sensory data for presentation by and/or on an output device. For example, a buffer for storing an image and/or text string may be a presentation space. A presentation space may be physically and/or logically contiguous or non-contiguous. A presentation space may have a virtual as well as a physical representation. A presentation space may include a storage location in processor memory, secondary storage, a memory of an output device adapter device, and/or a storage medium of an output device. A screen of a display, for example, is a presentation space.

As used herein, the terms "program", "program component", "application", "application component", "executable", and "executable component" refer to any data representation that may be translated into a set of machine code instructions and optional associated program data. Thus, a program or executable may include an application, a shared or non-shared library, and a system command. Program representations other than machine code include object code, byte code, and source code. Object code includes a set of instructions and/or data elements that either are prepared for linking prior to loading or are loaded into an execution environment. When in an execution environment, object code may include references resolved by a linker and/or may include one or more unresolved references. The context in which this term is used will make clear that state of the object code when it is relevant. This definition includes machine code and virtual machine code, such as Java™ byte code.

Various user interface elements illustrated in FIG. 7a presented by communications agent 503 may be presented by one or more user interface element handler components 511. User interface element handler component(s) 511 in FIG. 5 may send presentation information representing visual interface element(s), such as sender UI element 704a in FIG. 7a, to GUI subsystem 515. GUI subsystem 515 may instruct graphics subsystem 517 to draw the visual interface element(s) in a region of an output device, included in execution environment 501 of a node, based on the presentation information received in and/or generated from data received in the communication.

Input may be received via input driver 519 in FIG. 5. For example, a user may move a mouse to move a pointer presented in a display of first node 602 over send button 712a. The user may provide an input detected by the mouse. The detected input may be received by GUI subsystem 515 via input driver 519 as a send command indicator based on the association of the shared location of the pointer and the send button 712a in the presentation space of the display.

Data to send in a communication to a remote communications agent may be received by one or more content handler component(s) 509 to transform the data into one or more representations suitable for transmitting in the communication and/or suitable for processing by the remote communications agent. The one or more data representations may be provided to content manager component 506 for sending in the communication. Content manager component 506 may package the one or more data representations in a message formatted according to the communications protocol provided by communications protocol component 507. Content manager component 506 may alternatively or additionally encode and/or otherwise transform one or more of the data representations for sending in a data stream such as voice stream and/or a video stream for communicating in the communication to the remote communications agent.

Content manager component 506 may provide the packaged, encoded, and/or transformed data to communications protocol component 507 via com-out component 521. Com-out component 521 illustrates a component in communications agent 503 for operatively coupling communications agent 503 to communications protocol component 507 according to an interface provided by communications protocol component 507 for sending data in a communication according to a communications protocol embodied in communications protocol component 507. Communications protocol component 507 may further package and/or otherwise transform the data to send via network stack 505 for delivery via network 606 to a node including a communications agent representing a communicant in the communication.

With reference to FIG. 2, block 202 illustrates that the method includes receiving a resource criterion for a requesting a resource via a first communication including a message portion including a first message addressed to a first user represented by a first node. Accordingly, a system for processing a request for a resource in a communication includes means for receiving a resource criterion for a requesting a resource via a first communication including a message portion including a first message addressed to a first user represented by a first node. For example, as illustrated in FIG. 4a, criterion handler component 402 is configured for receiving a resource criterion for a requesting a resource via a first communication including a message portion including a first message addressed to a first user represented by a first node. FIG. 5 illustrates criterion handler component 502 as an adaptation and/or analog of criterion handler component 402 in FIG. 4a. One or more criterion handler components 502 operate in execution environment 501.

Figure 8:
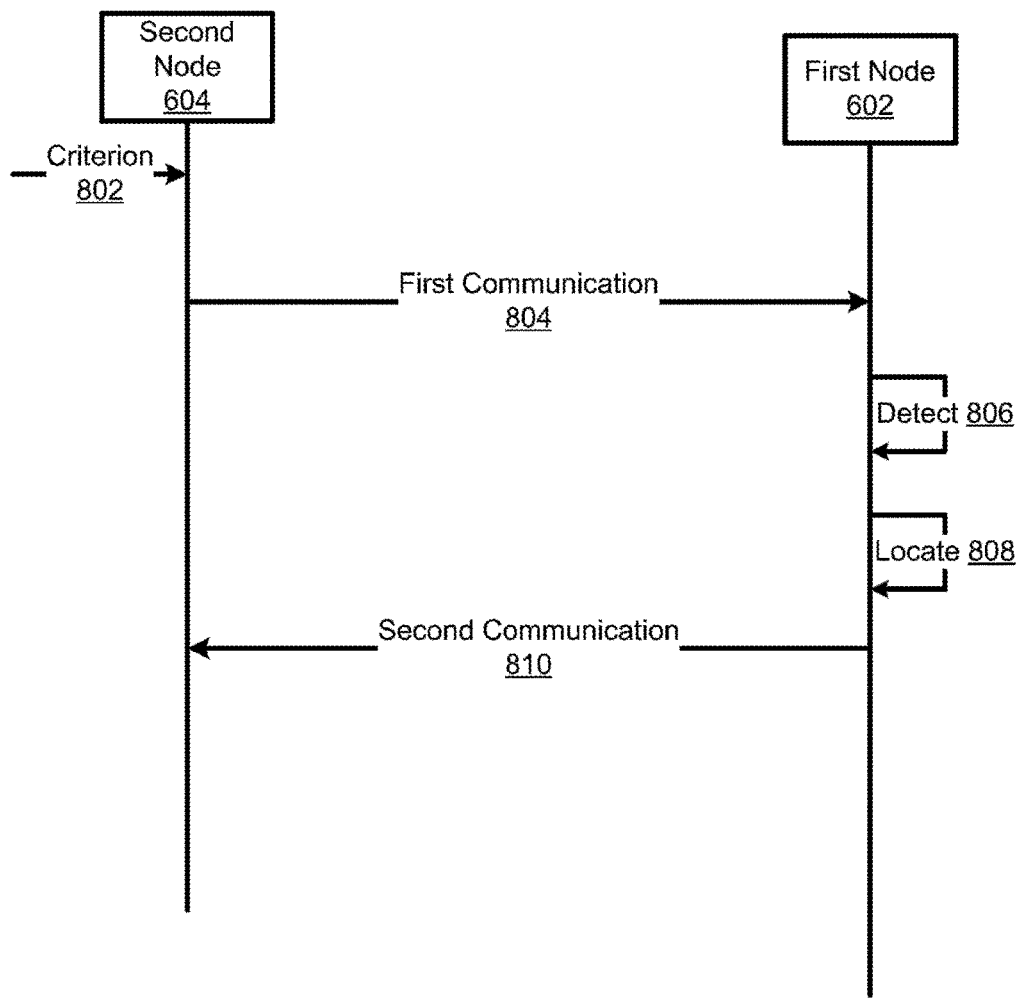
FIG. 8 is a message flow diagram illustrating a message flow in a system for processing a request for a resource in a communication according to an aspect of the subject matter described herein.

FIG. 8 illustrates a criterion message 802 communicated within second node 604 for receiving a resource criterion for sending a request for a resource to a first communicant represented by a communications agent in first node 602.

A second communicant may identify a first communicant to communicate with via a communication over a network. For example, an identifier of the first communicant may be received as input from the second communicant. The identifier may be received to initiate and/or otherwise include the first communicant in a communication. In FIG. 5, presentation controller 513 and/or a UI element handler 511 for recipient UI element 706a in FIG. 6 may receive an alias and/or communications address identifying the first communicant in response to a user input corresponding to recipient UI element handler 706a. The user input may be detected by, for example, input driver 519. Corresponding input information may be routed to presentation controller 513 by GUI subsystem 515 as described above.

The second communicant may provide a message for exchanging in the communication via a message UI element 710a. In FIG. 7, the second communicant may enter a message via a keyboard or other input device. The message to be sent to the first communicant may be presented, in response to detecting the message input by a UI element handler component 511 for a message UI element 710a presented in presentation space 708a.

Figure 7B:
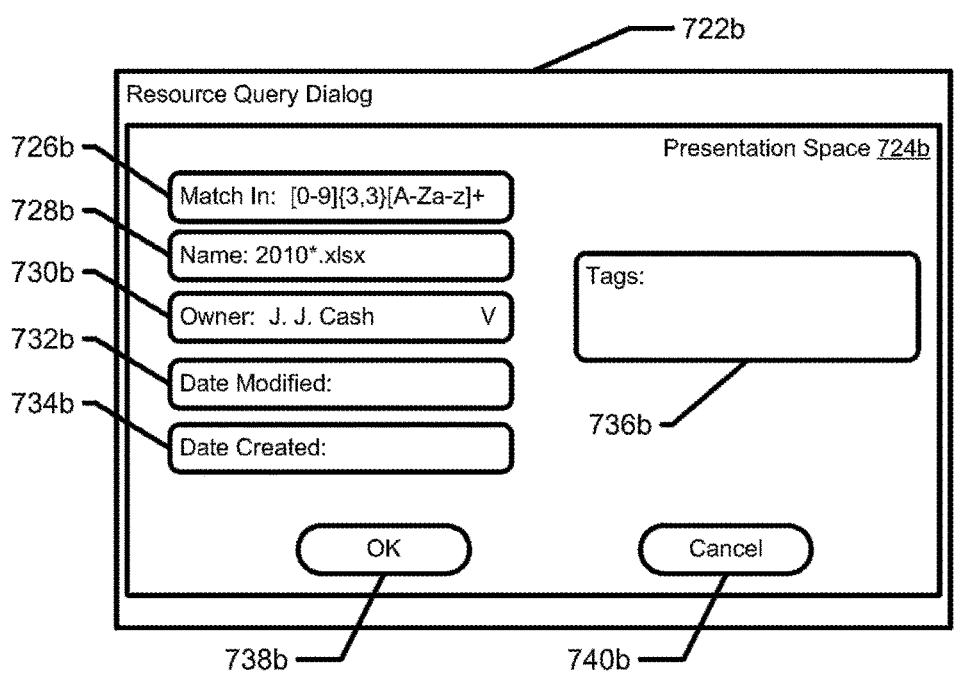
FIG. 7b is a diagram illustrating a user interface presented via a display according to another aspect of the subject matter described herein.

Resource query dialog 722b in FIG. 7b may be presented by presentation controller component 513 and/or one or more UI element handler components 511. Resource query dialog 722b may be presented in response to a user input detected corresponding to request button UI element 714a in FIG. 7a. Resource query dialog 722b may be presented for receiving one or more resource criteria for requesting a resource from the first communicant via a first communications agent representing the first communicant. A resource criterion may be a name or identifier of a resource, such as a URI. A criterion may be more complex and may be expressed in a formal query language, such as structured query language (SQL), for sending to the second communication agent.

Resource query dialog 722b illustrates attributes usable for locating one or more files. Presentation space 724b includes a number of form UI elements for receiving one or more resource criteria by criterion handler component 502. Execution environment 501 may include a single criterion handler component 502 to receive resource criterion via resource query dialog 722b or may include multiple criterion handler components 502. For example, execution environment 501 may include a criterion handler component 502 for each form UI element and/or may include a criterion handler component 502 for each type of form UI element.

"Match In" text box 726b illustrates a text box for receiving a resource criterion for matching content in a resource. "Match In" text box 726b illustrates that a resource criterion may be represented in a regular expression language. Name text box 728b illustrates a form UI element for representing a resource name according to a file system name expression language. Name text box 728b illustrates a resource criterion based on a "wild-card" symbol for matching one or more files or other named resources. Drop-down list UI element 730b illustrates that a request may identify a role associated with a resource as a resource criterion for matching a user, group, and/or other nameable entity associated with a resource. "Date Modified" UI element 732b and "Date Created" UI element 734b illustrated various date and/or time based resource criteria for matching date and/or time attributes of a resource. Text editor UI element 736b illustrates that a tag associated with a resource may be specified as a resource criterion. A resource criterion may be specified so that all or some of the criterion must be met for a resource.

In response to a user input corresponding to "OK" button 738b, form data received based on resource query dialog 722b may be received by criterion handler component 502 as a resource criterion or resource criteria. The resource criterion may be provided and/or otherwise identified to query generator component 504 to generate an attachment request for sending to the first communications agent in first node 602 along with the message received via message UI element 710a in FIG. 7a.

Returning to FIG. 2, block 204 illustrates that the method further includes sending, via a network to the first node, the first communication including a request portion that includes an attachment request based on the resource criterion. Accordingly, a system for processing a request for a resource in a communication includes means for sending, via a network to the first node, the first communication including a request portion that includes an attachment request based on the resource criterion. For example, as illustrated in FIG. 4a, query generator component 404 is configured for sending, via a network to the first node, the first communication including a request portion that includes an attachment request based on the resource criterion. FIG. 5 illustrates query generator component 504 as an adaptation and/or analog of query generator component 404 in FIG. 4a. One or more query generator components 504 operate in execution environment 501.

FIG. 8 illustrates first communication 804 including an attachment request in a request portion of first communication 804. FIG. 8 illustrates second node 604 sending first communication 804 and first node 602 receiving first communication 804.

A query may be specified in a standard query language, such as structured query language (SQL). In an aspect, query generator component 504 may represent a specified resource criterion in an attachment request based on capabilities of a first communications agent identified via a previous communication between first node 602 and second node 604.

In response to an indication to initiate a communication and/or to otherwise send data in a communication, message data whether voice, text, and/or image data may be sent by communications agent 503 in second node 604 via communications protocol component 507 for delivery to the first communication agent representing the identified first communicant. For example, a user input corresponding to send button 712a may be received by presentation controller component 513 via input driver 519 and GUI subsystem 515 as described above. Presentation controller component 513 may provide one or more portions of data to send in the communication to one or more content handlers according to the types of the one or more portions. For example, a text message may be provided to a text/plain content handler 509 for processing content types having text/plain and/or text/* MIME type identifiers. Query generator component 504 may include and/or may be included in a content handler instructed to process resource criterion information received from one or more criterion handler component 502 into an attachment request included in a request portion of the communication to be sent.

One or more representations of the attachment request may be generated based on the resource criterion. Query generator component 504 in FIG. 5 may format, encode, and/or otherwise transform the received resource criterion information into an attachment request in a format suitable for first node 602. FIG. 9a illustrates email communication 900a. Email communication 900a is illustrated formatted as a multipart/mixed content type including request portion 902a. Request portion 902a may be identified as a request by its location in the communication and/or by its content type. A request portion content type may be detected based on content included in the message and/or based on metadata such as content-type header 904a identifying a MIME type identifier, such as "application/attachment-query", defined for representing one or more resource criteria in an attachment request. The "application/attachment-query" MIME type identifier is exemplary. Other MIME type identifiers exist that may be defined to identify an attachment request, and new MIME type identifiers for identifying a request portion in a communication may be defined.

A content type identifying a request portion may be included in a representation of an attachment request. For example, a content handler 509 may be configured to detect a request portion based on detecting valid XQuery and/or SQL content, as described above. A content type identifier may be a position and/or location in a communication. The position or location may be absolute or relative. For example, a schema for a communication may define that a request portion in a communication is included in the communication at the end of the communication. There may be one or more request portions at the end. In another aspect, a schema for a communication may specify that a portion of a communication following a message portion is a request portion. Other request portions may follow. If no attachment request is included, the request portion may include no content or may include an indicator that no attachment request is included.

FIG. 9a illustrates that "application/attachment-query" MIME type identifier may identify a schema for an XML-based language for specifying attachment-query documents. FIG. 9a illustrates attachment-query document 906a. Attachment-query document 906a includes criterion tag elements 908a corresponding to the form elements in FIG. 7a. A criterion tag element 908a identifies a resource criterion name, such as "content" indicating that the criterion is associated with the content of a resource. A criterion tag element 908a also identifies a criterion type, such as "regex" indicating that the criterion is represented according to a particular regular expression language. A criterion tag element 908a identifies a value for matching according to the type of the criterion. FIG. 9a illustrates "and" tag 910a indicating that all the resource criteria must be met for identifying a resource. An "or" tag (not shown) may be defined by a schema for attachment-query documents. Other operator elements and operator precedence may be defined by the schema. Grouping elements for managing operator precedence, such as parenthesis element, may be defined by the schema.

A request portion generated by query generator component 504, along with a message portion and any other data to include in the communication, may be provided and/or otherwise identified to content manager component 506 for sending in the communication. Content manager component 506 and com-out component 521 may further package and/or transform the data so that it is suitable for sending in the communication. Com-out component 521 may provide the resource portion, the message portion, and any other data for sending in the communication in representations suitable for sending by communications protocol component 507 to the first communications agent in first node 602 in first communication 804 in FIG. 8.

With reference to FIG. 3, block 302 illustrates that the method includes receiving, via a network by a first node, a first communication including a first message addressed to a first user. Accordingly, a system for processing a request for a resource in a communication includes means for receiving, via a network by a first node, a first communication including a first message addressed to a first user. For example, as illustrated in FIG. 4b, com-in component 412 is configured for receiving, via a network by a first node, a first communication including a first message addressed to a first user. FIG. 5 illustrates com-in component 512 as an adaptation and/or analog of com-in component 412 in FIG. 4b. One or more com-in components 512 operate in execution environment 501.

The communication illustrated by first communication 804 in FIG. 8 may be received by a communications agent in first node 602. The first communication may be delivered to first node 602 based on an address of the communications agent identifying a first communicant represented by the communications agent 503 instance of first node 602. Communications agent 503 may represent other communicants having other addresses. The address in first communication 804 indicates that the content of first communication 804 including a message portion is addressed to the first communicant.

The first communication illustrated by first communication 804 in FIG. 8 may be received in one or more packets via network 606 by network stack 505 and communications protocol component 507 in an instance of and/or analog of execution environment 501 including and/or otherwise provided by first node 602. The data in the communication may be received by com-in component 512. Com-in component 512 may provide the data to content manager component 506. Content manager component 506 may determine one or more content types of the data. The content and/or portions of the content may be provided to one or more content type handler components 509 based on the one or more content types identified by content manager component 506. For example, FIG. 9a illustrates message portion 912a including "text/plain" MIME type identifier 914a as a content type identifier. Message portion 912a may be provided to a text/plain content handler 509. Audio data in a voice communication may be provided to an audio content handler component 509, and video data in a video communication may be provided to a video content handler component 509.

Returning to FIG. 3, block 304 illustrates that the method further includes detecting, by the first node, an attachment request included in the first communication. Accordingly, a system for processing a request for a resource in a communication includes means for detecting, by the first node, an attachment request included in the first communication. For example, as illustrated in FIG. 4b, query content handler component 414 is configured for detecting, by the first node, an attachment request included in the first communication. FIG. 5 illustrates query content handler component 514 as an adaptation and/or analog of query content handler component 414 in FIG. 4b. One or more query content handler components 514 operate in execution environment 501.

FIG. 8 illustrates detect message 806 communicated within first node 602 for detecting one or more attachment requests for locating the resource.

Content manager component 506 may detect content type information described above to detect a request portion of a communication. For example, the content illustrated in FIG. 9a may be received in first communication 804. Content manager component 506 may detect "application/attachment-query" MIME type identifier in content-type header 904a. The "application/attachment-query" MIME type identifier may be defined to identify an attachment request based on one or more resource criteria for identifying a requested resource. Content manager component 506 may identify request portion 902a as including the attachment request.

In response to detecting an attachment request in first communication 804, content manager component 506 may provide attachment request and/or a resource criterion identified to query content handler component 514. For example, query content handler component 514 may be configured to operate according to a schema defining a format and/or a vocabulary for an XML-based language for attachment-query documents. Communication manager component 506 may provide attachment-query document 906a, as an attachment request, to query content handler component 514. Query content handler component 514 may operate according to an attachment-query schema. In an aspect, a query content handler component may process more than one attachment request content type. Alternatively or additionally, execution environment 501 may include multiple query content handlers 514 for supporting multiple attachment request content types.

Figure 7C:
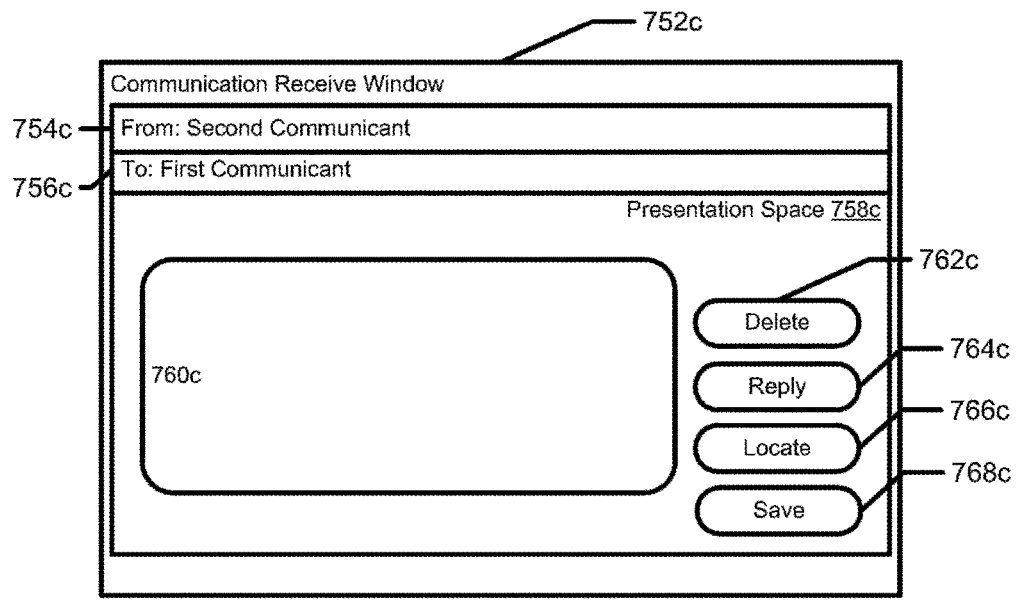
FIG. 7c is a diagram illustrating a user interface presented via a display according to another aspect of the subject matter described herein.

FIG. 7c illustrates a user interface presented by a communications agent for presenting data received in a communication with another communications agent. Communication receive window 752c may be presented by presentation controller 513 and/or one or more UI element handler components 511 operating in an instance, adaptation, and/or analog of execution environment 501 including and/or otherwise provided by first node 602. "From" UI element 754c may include an identifier of the second communicant responsible for sending first communication 804. "To" UI element 756c may include an identifier of the first communicant represented by the first communications agent in first node 602 illustrated by communications agent 503 in FIG. 5. Text, image, and/or video content received in the communication may be presented in content pane 760c in presentation space 758c of communication receive window 752c. User interface controls for managing the communications and/or content received in the communication may be represented by various types of UI elements.

In FIG. 7c, communication receive window 752c illustrates delete button 762c for receiving an input to delete content received in first communication 804, reply button 764c for creating and/or sending data in a second communication in reply to the received first communication 804, locate button 766c for locating a resource based on attachment-query document 906a detected in request portion 902a in first communication 804, and a save button 768c for saving the message portion and other content received in first communication 804 in a particular folder and/or location in a data store in the execution environment of first node 602. When an attachment request is not detected, locate button 766c may be presented as inactive or not presented in second communication receive window 752c.

Returning to FIG. 3, block 306 illustrates that the method yet further includes locating a resource based on the attachment request. Accordingly, a system for processing a request for a resource in a communication includes means for locating a resource based on the attachment request. For example, as illustrated in FIG. 4b, resource location component 416 is configured for locating a resource based on the attachment request. FIG. 5 illustrates resource location component 516 as an adaptation and/or analog of resource location component 416 in FIG. 4b. One or more resource location components 516 operate in execution environment 501.

FIG. 8 illustrates locate message 808 communicated within first node 602 for initiating a search and/or otherwise for locating a resource based on the attachment request.

In an aspect, communications agent 503 in FIG. 5 may invoke resource location component 516 automatically to locate one or more resources based on an identified resource criterion in an attachment request and in response to detecting an attachment request in a communication. In another aspect, communications agent 503 may invoke resource location component 516 automatically to locate one or more resources based on an attachment request in a communication in response to detecting an indication to present, via an output device, some or all of a message received in a message portion of the communication. Resource location component 516 may be invoked and/or may operate based on the attachment request and/or resource criterion identified to locate a resource prior to, during, and/or after other content received in the communication is processed. Processing may include, for example presenting a message included in the message portion in message UI element 760c in FIG. 7c in communication receive window 752c.

In another aspect, communications agent 503 operating in first node 602 may present a UI control, such as locate button 766c, to receive an instruction from the first communicant to locate a resource based on an attachment request. Alternatively or additionally, communications agent 503 may identify a resource based on an attachment request via resource location component 516 in response to detecting user input for replying, forwarding, and/or otherwise responding to the received communication. Presentation controller component 513 may receive input information in response to a detected user input that corresponds to reply button 764c. Presentation controller component 513 may interoperate with resource location component 516 to identify one or more resources that match a resource criterion identified by the attachment request prior to, during, and/or after the first communicant provides message content for the reply. Alternatively or additionally, communication receive window 752c or an analogous user interface may be presented for receiving data to send in a second communication in reply to first communication 804. The user interface for replying to first communication 804 may include locate button 766c and/or an analogous UI control for receiving an indication from the first communicant to locate a resource based the attachment request.

The method illustrated in FIG. 2 may include additional aspects supported by various adaptations and/or analogs of the arrangement of components in FIG. 4a. As described above, in one aspect a resource may be located automatically in response to detecting the attachment request. In another aspect, locating a resource may include presenting a locator UI element representing an attachment request. Locate button 766c in FIG. 7c exemplifies one type of locator UI control. Locate button 766c may be presented by presentation controller component 513 as described above. A user input corresponding to a locator UI control, such as locate button 766c, may be detected by presentation controller component 513. Presentation controller component 513 may instruct resource location component 516 to locate the resource based on an attachment request represented by the locator UI control.

In another aspect, a locator UI element may be presented to receive one or more additional resource criteria from a user. Based on the locator UI element and input from the user, resource location component 516 may receive criterion information identifying an additional criterion. Resource location component 516 may locate one or more resources in response to receiving the additional criterion. For example, a resource criterion may identify a resource file name, such as "febAccounts.xlsx". A file locator dialog may be presented by presentation controller component 513 including a representation of the file name. The file locator dialog may be presented to receive input for navigating to a directory or folder including a file with a matching file name. Based on user input, a folder and/or directory is identified as an additional resource criterion.

In another example, a request may include a resource criterion that matches files that include content with a content type matching text/plain MIME type identifier and that were created in the last seven days since the communication including the attachment request was received. A locator dialog may be presented including representations of all files in a node that match the resource criteria. User input to select for inclusion and/or select for exclusion identifies an additional criterion that identifies at least a portion of the files represented in the locator UI element.

Returning to FIG. 3, block 308 illustrates that the method additionally includes sending, to a second node, a second communication including the located resource, as an attachment, and including a second message addressed to a second user. Accordingly, a system for processing a request for a resource in a communication also includes means for sending, to a second node, a second communication including the located resource, as an attachment, and including a second message addressed to a second user. For example, as illustrated in FIG. 4b, the access director component 418 is configured for sending, to a second node, a second communication including the located resource, as an attachment, and including a second message addressed to a second user. FIG. 5 illustrates access director component 518 as an adaptation and/or analog of access director component 418 in FIG. 4b. One or more access director components 518 operate in execution environment 501.

FIG. 8 illustrates second communication 810, including the resource located based on the attachment request, sent by first node 602. The resource is included as an attachment in second communication 810 to a second message included in a message portion of second communication 810. FIG. 8 illustrates second communication 810 received by second node 604.

Resource location component 516 may identify to access director component 518 one or more resources in a data base, a file system, and/or other resource data store based on the attachment request. Access director component 518 may identify a service for generating and/or accessing a resource. Access director component 518 may interoperate with the service to generate and/or otherwise access the located resource(s). A data store and/or service accessed by access director component 518 and/or by a component operating on behalf of access director component 518 may be included in the execution environment of first node 602. A data store and/or service accessed by access director component 518 may be included in an execution environment of another node and accessed via network 606.

In response to accessing a resource located by resource location component 516, access director component 518 may provide and/or otherwise identify the resource to a suitable content handler component 509 based on a content type of the resource. The content handler component 509 may decode, encode, reformat, translate, and/or otherwise transform the resource for including in second communication 810.

FIG. 9b illustrates communication 900b that may be communicated in second communication 810. Second message portion 902b illustrates a message portion in second communication 810. Note that a message portion may be empty as illustrated by message portion 902b. Attachment portion 904b illustrates the resource as image data encoded for sending in a text-based communication.

Message portion 902b and attachment portion 904b may be provided by respective content handler components 509 to content manager component 506. Content manager component 506 may construct the content as illustrated in FIG. 9b and/or otherwise provide for encoding, translating, combining, and/or otherwise preparing the content for sending in second communication 810. As described above, communication manager component 506 may send second communication 810 via com-out component 521 communicatively coupling content manager component 506 to communications protocol component 507 and/or network stack component 505 for sending second communication 810 via network 606 to second node 604 addressed to the second communicant represented by the communications agent operating in second node 604.

Returning to FIG. 2, block 206 illustrates that the method yet further includes receiving, by a second node representing a second user, a second communication including, based on the request portion, the resource, as an attachment, and a second message addressed to the second user. Accordingly, a system for processing a request for a resource in a communication includes means for receiving, by a second node representing a second user, a second communication including, based on the request portion, the resource, as an attachment, and a second message addressed to the second user. For example, as illustrated in FIG. 4a, content manager component 406 is configured for receiving, by a second node representing a second user, a second communication including, based on the request portion, the resource, as an attachment, and a second message addressed to the second user. FIG. 5 illustrates content manager component 506 as an adaptation and/or analog of content manager component 406 in FIG. 4a. One or more content manager components 506 operate in execution environment 501.

Data sent in second communication 810, by first node 602, may be received by com-in component 512 operating in an instance, adaptation, and/or analog of execution environment 501 including and/or provided by second node 604. The received communication includes a message addressed to the second communicant and an attachment including the resource located based on the attachment request identified by first communication 804. Content manager component 506 may detect the message portion, such as message portion 902b in second communication 810. Content manager component 506 may detect an attachment portion, such as attachment portion 904b in second communication 810. Message portion 902b and attachment portion 904b may be provided to suitable content handler components 509 based on the content types of the message portion and the attachment portion detected by content manager component 506.

In an aspect, an attachment portion that is a response to an attachment request sent in a previous message may include information identifying the attachment as a response. For example, an attachment request may be sent with a correlator and a located resource received in an attachment may identify the correlator to identify the attachment as a response to the particular attachment request previously sent.

Figure 7D:
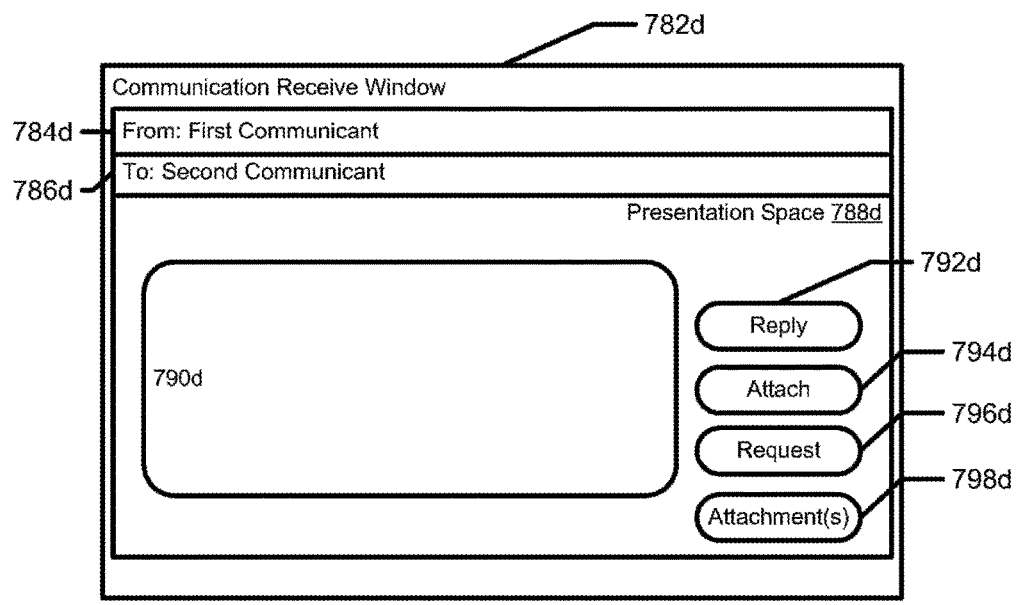
FIG. 7d is a diagram illustrating a user interface presented via a display according to another aspect of the subject matter described herein.

In an aspect, accessing a resource received in response to an attachment request includes presenting, via an output device, an attachment user interface control representing the resource. In response to detecting a user input corresponding to the attachment user interface control, the resource may be accessed. One or more content handler components 509 may process data received in second communication 810 to represent that data in a format for presenting to the second communicant. Communication receive window 782d in FIG. 7d illustrates user interface components for presenting the message to the second communication received in second communication 810. Communication receive window 782d is similar to first communication receive window 752b but includes an attachment(s) UI element 798d based on the attachment portion in second communication 810.

In an aspect, access handler component 523 may be invoked to access the resource in response to a user input corresponding to attachments button 798d. For example, an input driver component 519 may detect an input and GUI subsystem 515 may associate the detected input with a location in a display where attachments button 798d is presented. GUI subsystem 515 may invoke presentation controller component 513 and/or a UI element handler component 511 associated with attachments button 798d to process the detected user input. Access handler component 523 may retrieve the resource from the communication. The content of the communication may be stored in one or more data stores accessed via one or more data storage systems, such as file system/DBMS component 525 and/or a processor memory included in execution environment 501 of second node 604.

In another aspect, the resource may be accessed automatically without receiving an indication from the second communicant to access the resource. For example, content manager component 506 may detect the attachment portion in the content received in second communication 810. Content manager component 506 may provide a representation of the resource included in the attachment portion to access handler component 523 in response to detecting the access information. Access handler component 523 may decode, reformat, translate, and/or otherwise transform the representation of the resource for presenting to the second communicant and/or for storing in a location in a data store accessed via a storage subsystem.

The method illustrated in FIG. 2 may include additional aspects supported by various adaptations and/or analogs of the arrangement of components in FIG. 4a. The method illustrated in FIG. 3 may include additional aspects supported by various adaptations and/or analogs of the arrangement of components in FIG. 4b. In one aspect, the first communication in the method illustrated in FIG. 2 and in the method illustrated in FIG. 3 may include a text message, an email, audio data, an instant message, and/or image data. In another aspect, the attachment request may be represented according to a criterion schema. The criterion schema defines a format for representing the attachment request and/or defines a vocabulary of valid values includable in the attachment request. Query generator component 504 may generate an attachment request according to a criterion schema and query content handler component 514 may determine whether an attachment request is valid according to the schema. Query content handler component 514 may also identify an attachment request based on a criterion schema and/or identify a resource criterion in the attachment request based on a criterion schema.

A criterion schema may be identified by a schema identifier, such as a MIME type identifier and/or a URI. Second node 604 may receive a criterion schema identifier sent from first node 602 prior to sending first communication 804. Alternatively or additionally, a schema may be preconfigured in a communications agent. For example, a content handler component 509 may operate on a request portion of a communication according to a schema for specifying an attachment request. The rules of the schema may be read from a configuration data store and/or may be included in one or more instructions in the attachment request content hander component 509. Query content handler component 504 and/or query content handler component 514 may receive a criterion schema from any of the sources described and/or any other suitable sources.

In another aspect, one or more resource criteria may be predefined. A resource criterion may be defined by a criterion schema and/or may be defined, for example by a user, according to a criterion schema. One or more resource criteria may be included in an attachment request expression or condition. Some or all of the attachment request expression or condition may be predefined, generated by query generator component 504, and/or generated based on user input. Second node 604 may receive a predefined attachment request and/or a predefined attachment request condition sent from first node 602. A predefined criterion and/or condition allows the first node to restrict and/or otherwise control attachment requests and/or may be provided for the convenience of communicants in specifying attachment requests.

As described above with respect to the method illustrated in FIG. 2, an attachment request may be received via a user interface element including a form element. In an aspect, an attachment request may specify a form element. For example, an attachment requested by a second communicant of second node 604 may be information known to a first communicant of first node 602. An attachment request may specify a user interface element including a form element. Locating the resource by first node 602 may include presenting the user interface element and receiving input from the first communicant corresponding to the form element. The resource sent by first node 602 as an attachment in second communication 810 may include information that corresponds to the form element and that is based on the input received from the first communicant. Exemplary user interface elements that may include and/or may be included in form elements include a window, a textbox, a slider, a list box, a drop-down list, a spinner, a menu, a menu item, a toolbar, a ribbon, a combo box, a tree, a grid, a navigation tab, a scrollbar, a label, a tooltip, text in various fonts, a balloon, a dialog box, and/or a button.

An attachment request may be based on a date, a time, a length of time, a file type, a database record key, content of the resource, a content type identifier, a format rule, a vocabulary, a role of a user, a security attribute, a location in a data storage system such as a file system, an attribute of an identified resource, a size, a task, a transaction, a state, a user, a group, a requester, a relationship including a requesting user and a responding user, a keyword, a tag, a folder, and/or a path portion of a resource identifier, to name a few examples.

As described above, a matching condition may include and/or otherwise identify an attachment request. A located resource must meet the matching condition in an aspect. Alternatively or additionally, an attachment request may include an instruction and/or input for generating a resource, and locating the resource may include generating the resource. Generating a resource may include creating the resource and/or may include modifying and/or otherwise transforming an existing resource.

In the method illustrated in FIG. 2, sending a first communication may include storing a criterion content type identifier in the first communication, as illustrated by content-type header 904a in FIG. 9a. Analogously, detecting an attachment request in the method illustrated in FIG. 3 may include detecting a criterion content type identifier in a first communication to determine that a request portion in the first communication includes an attachment request. The criterion content type may be defined to indicate that the request portion includes the attachment request.

A criterion content type identifier may include a MIME type identifier. In FIG. 9a, "application/attachment-query" in content-type header 904a illustrates a criterion content type identifier. A MIME type identifier may identify a criterion schema and/or a schema for a request portion and/or an attachment in a request portion. A criterion content type identifier may be any detectable information that identifies any of a criterion schema and/or a schema for a request portion and/or an attachment in a request portion.

In various aspects, a resource criterion may be detected and/or represented based on various syntaxes, grammars, vocabularies, and/or languages. For example, a resource criterion may be identified and/or represented according to a file system search syntax, a regular expression language, a structured query language (SQL) query, a universal resource identifier schema, an XPATH based language, an XQuery based language, an XML based language, an HTML based language (form-based), and/or a keyword-value pair-based language.

A request portion including an attachment request in a communication may be received by a first communicant and sent on behalf of a second communicant via a first communications protocol, and a message in the communication may be exchanged in the communication via a second communications protocol. For example, a message may be sent from second node 604 to first node 602 via an RTP session according to the specification of real-time transport protocol. The second communicant may send an attachment request in the communication session via a request reply protocol such as specified for XMPP. Both the XMPP request and the RTP session may be included in a communication.

Exemplary resources that may be requested via an attachment request include a file, a program component, a data base record, video data, audio data, markup language, binary data, text data, an output of a service. Requested resources may be pre-existing, volatile, and/or generated in response to the request.

A request portion in a communication may be identified and detected in the communication based on a term in a vocabulary defined by the criterion schema to indicate that the request portion includes the attachment request and/or includes a location defined by a format specification to indicate that the request portion includes the attachment request. For example, a content handle component 509 may be configured to detect the <attachment-query> tag in attachment-query document 906a in FIG. 9a. Content handler component 509 may detect and/or otherwise identify attachment-query document 906a as a request portion. Content handler component 509 may be configured to detect an "application/attachment-query" MIME type identifier in a content-type header, or it may be configured not to detect the application/attachment-query MIME type identifier while still detecting the request portion based on the <attachment-query> tag.

As described above, an attachment including a requested resource may be identified and/or detected in a communication based on a content type identifier. A content type identifier for an attachment may be represented and/or detected based on an identifiable location in the communication defined to include some or all of the attachment, a detectable format of some or all of the attachment, a detectable data entity included in a vocabulary specified for the attachment, and/or a symbolic identifier defined to indicate that the communication includes the attachment.

An attachment in a communication may be sent and/or received in the communication via a first communications protocol, and a message in the communication may be, respectively, sent and/or received via a second communication protocol. As described above, a message may be communicated via voice data sent according to RTP protocol. An attachment request and a response including an attachment may be communicated according to a request/reply protocol specified by XMPP.

An attachment may be included in a communication based on a requested-attachment schema defining to the second node at least one of a format and a vocabulary for processing the attachment.

To the accomplishment of the foregoing and related ends, the descriptions and annexed drawings set forth certain illustrative aspects and implementations of the disclosure. These are indicative of but a few of the various ways in which one or more aspects of the disclosure may be employed. The other aspects, advantages, and novel features of the disclosure will become apparent from the detailed description included herein when considered in conjunction with the annexed drawings.

It should be understood that the various components illustrated in the various block diagrams represent logical components that are configured to perform the functionality described herein and may be implemented in software, hardware, or a combination of the two. Moreover, some or all of these logical components may be combined, some may be omitted altogether, and additional components may be added while still achieving the functionality described herein. Thus, the subject matter described herein may be embodied in many different variations, and all such variations are contemplated to be within the scope of what is claimed.

To facilitate an understanding of the subject matter described above, many aspects are described in terms of sequences of actions that may be performed by elements of a computer system. For example, it will be recognized that the various actions may be performed by specialized circuits or circuitry (e.g., discrete logic gates interconnected to perform a specialized function), by program instructions being executed by one or more instruction-processing units, or by a combination of both. The description herein of any sequence of actions is not intended to imply that the specific order described for performing that sequence must be followed.

Moreover, the methods described herein may be embodied in executable instructions stored in a computer-readable medium for use by or in connection with an instruction execution machine, system, apparatus, or device, such as a computer-based or processor-containing machine, system, apparatus, or device. As used here, a "computer-readable medium" may include one or more of any suitable media for storing the executable instructions of a computer program in one or more of an electronic, magnetic, optical, electromagnetic, and infrared form, such that the instruction execution machine, system, apparatus, or device may read (or fetch) the instructions from the computer-readable medium and execute the instructions for carrying out the described methods. A non-exhaustive list of conventional exemplary computer-readable media includes a portable computer diskette; a random-access memory (RAM); a read only memory (ROM); an erasable programmable read only memory (EPROM or Flash memory); optical storage devices, including a portable compact disc (CD), a portable digital video disc (DVD), a high definition DVD (HD-DVD™), a Blu-ray™ disc; and the like.

Thus, the subject matter described herein may be embodied in many different forms, and all such forms are contemplated to be within the scope of what is claimed. It will be understood that various details may be changed without departing from the scope of the claimed subject matter. Furthermore, the foregoing description is for the purpose of illustration only, and not for the purpose of limitation, as the scope of protection sought is defined by the claims as set forth hereinafter.

All methods described herein may be performed in any order unless otherwise indicated herein explicitly or by context. The use of the terms "a" and "an" and "the" and similar referents in the context of the foregoing description and in the context of the following claims are to be construed to include the singular and the plural, unless otherwise indicated herein explicitly or clearly contradicted by context. The foregoing description is not to be interpreted as indicating that any non-claimed element is essential to the practice of the subject matter as claimed.

One or more aspects of the disclosure are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of the disclosure. It may be evident, however, to one skilled in the art that one or more aspects of the disclosure may be practiced with a lesser degree of these specific details. In other instances, well-known structures and devices are shown in block diagram form in order to facilitate describing one or more aspects of the disclosure.

Figure 10:
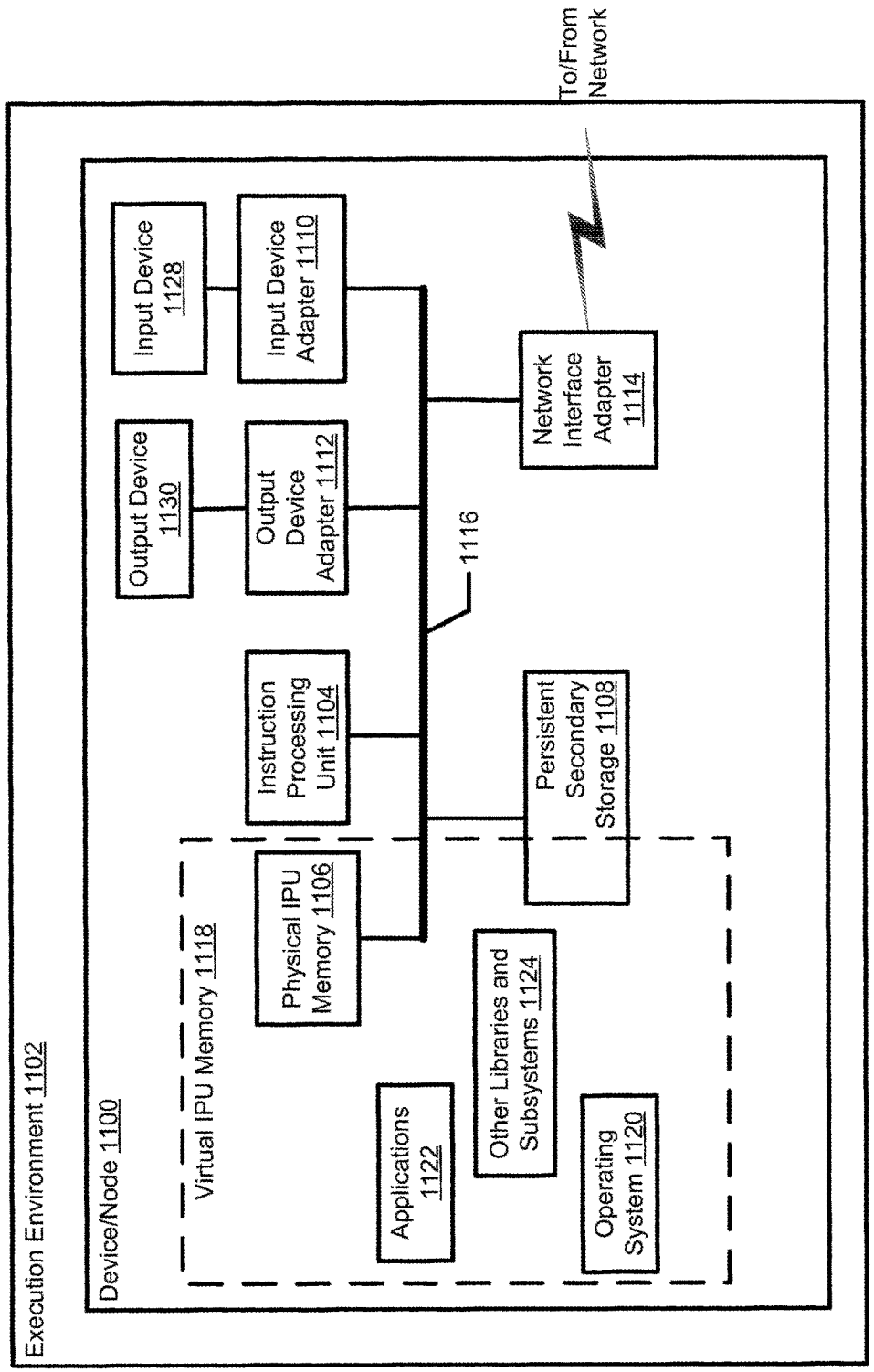
FIG. 10 is a block diagram illustrating an exemplary hardware device included in and/or otherwise providing an execution environment in which the subject matter may be implemented.

An exemplary device included in an execution environment that may be configured according to the subject matter is illustrated in FIG. 10. An execution environment includes an arrangement of hardware and, optionally, software that may be further configured to include an arrangement of components for performing a method of the subject matter described herein. An execution environment includes and/or is otherwise provided by one or more devices. An execution environment may include a virtual execution environment including software components operating in a host execution environment. Exemplary devices included in or otherwise providing suitable execution environments for configuring according to the subject matter include personal computers, notebook computers, tablet computers, servers, handheld and other mobile devices, multiprocessor devices, distributed devices, consumer electronic devices, routers, communication servers, and/or other network-enabled devices. Those skilled in the art will understand that the components illustrated in FIG. 10 are exemplary and may vary by particular execution environment.

FIG. 10 illustrates hardware device 1100 included in execution environment 1102. FIG. 10 illustrates that execution environment 1102 includes instruction-processing unit (IPU) 1104, such as one or more microprocessors; physical processor memory 1106 including storage locations identified by addresses in a physical memory address space of IPU 1104; persistent secondary storage 1108, such as one or more hard drives and/or flash storage media; input device adapter 1110, such as a key or keypad hardware, a keyboard adapter, and/or a mouse adapter; output device adapter 1112, such as a display or audio adapter for presenting information to a user; a network interface component, illustrated by network interface adapter 1114, for communicating via a network such as a LAN and/or WAN; and a communication mechanism that couples elements 1104-1114, illustrated as bus 1116. Elements 1104-1114 may be operatively coupled by various means. Bus 1116 may comprise any type of bus architecture, including a memory bus, a peripheral bus, a local bus, and/or a switching fabric.

IPU 1104 is an instruction execution machine, apparatus, or device. Exemplary IPUs include one or more microprocessors, digital signal processors (DSPs), graphics processing units, application-specific integrated circuits (ASICs), and/or field programmable gate arrays (FPGAs). In the description of the subject matter herein, the terms "IPU" and "processor" are used interchangeably. IPU 1104 may access machine code instructions and data via one or more memory address spaces in addition to the physical memory address space. A memory address space includes addresses identifying locations in a processor memory. The addresses in a memory address space are included in defining a processor memory. IPU 1104 may have more than one processor memory. Thus, IPU 1104 may have more than one memory address space. IPU 1104 may access a location in a processor memory by processing an address identifying the location. The processed address may be in an operand of a machine code instruction and/or may be identified in a register or other portion of IPU 1104.

FIG. 10 illustrates virtual processor memory 1118 spanning at least part of physical processor memory 1106 and at least part of persistent secondary storage 1108. Virtual memory addresses in a memory address space may be mapped to physical memory addresses identifying locations in physical processor memory 1106. An address space for identifying locations in a virtual processor memory is referred to as a virtual memory address space; its addresses are referred to as virtual memory addresses; and its processor memory is known as a virtual processor memory or virtual memory. The term "processor memory" may refer to physical processor memory 1106 and/or virtual processor memory 1118 depending on the context in which the term is used.

Physical processor memory 1106 may include various types of memory technologies. Exemplary memory technologies include static random-access memory (SRAM) and/or dynamic RAM (DRAM) including variants such as dual data rate synchronous DRAM (DDR SDRAM), error correcting code synchronous DRAM (ECC SDRAM), and/or RAMBUS DRAM (RDRAM). Physical processor memory 1106 may include volatile memory as illustrated in the previous sentence and/or may include nonvolatile memory such as nonvolatile flash RAM (NVRAM) and/or ROM.

Persistent secondary storage 1108 may include one or more flash memory storage devices, one or more hard disk drives, one or more magnetic disk drives, and/or one or more optical disk drives. Persistent secondary storage 1108 may include removable media. The drives and their associated computer-readable storage media provide volatile and/or nonvolatile storage for computer-readable instructions, data structures, program components, and other data for execution environment 1102.

Execution environment 1102 may include software components stored in persistent secondary storage 1108, in remote storage accessible via a network, and/or in a processor memory. FIG. 10 illustrates execution environment 1102 including operating system 1120, one or more applications 1122, and other program code and/or data components illustrated by other libraries and subsystems 1124. In an aspect, some or all software components may be stored in locations accessible to IPU 1104 in a shared memory address space shared by the software components. The software components accessed via the shared memory address space are stored in a shared processor memory defined by the shared memory address space. In another aspect, a first software component may be stored in one or more locations accessed by IPU 1104 in a first address space and a second software component may be stored in one or more locations accessed by IPU 1104 in a second address space. The first software component is stored in a first processor memory defined by the first address space and the second software component is stored in a second processor memory defined by the second address space.

Software components typically include instructions executed by IPU 1104 in a computing context referred to as a "process". A process may include one or more "threads". A "thread" includes a sequence of instructions executed by IPU 1104 in a computing sub-context of a process. The terms "thread" and "process" may be used interchangeably herein when a process includes only one thread.

Execution environment 1102 may receive user-provided information via one or more input devices illustrated by input device 1128. Input device 1128 provides input information to other components in execution environment 1102 via input device adapter 1110. Execution environment 1102 may include an input device adapter for a keyboard, a touch screen, a microphone, a joystick, a television receiver, a video camera, a still camera, a document scanner, a fax, a phone, a modem, a network interface adapter, and/or a pointing device, to name a few exemplary input devices.

Input device 1128 included in execution environment 1102 may be included in device 1100 as FIG. 10 illustrates or may be external (not shown) to device 1100. Execution environment 1102 may include one or more internal and/or external input devices. External input devices may be connected to device 1100 via corresponding communication interfaces such as a serial port, a parallel port, and/or a universal serial bus (USB) port. Input device adapter 1110 receives input and provides a representation to bus 1116 to be received by IPU 1104, physical processor memory 1106, and/or other components included in execution environment 1102.

Output device 1130 in FIG. 10 exemplifies one or more output devices that may be included in and/or may be external to and operatively coupled to device 1100. For example, output device 1130 is illustrated connected to bus 1116 via output device adapter 1112. Output device 1130 may be a display device. Exemplary display devices include liquid crystal displays (LCDs), light emitting diode (LED) displays, and projectors. Output device 1130 presents output of execution environment 1102 to one or more users. In some embodiments, an input device may also include an output device. Examples include a phone, a joystick, and/or a touch screen. In addition to various types of display devices, exemplary output devices include printers, speakers, tactile output devices such as motion producing devices, and other output devices producing sensory information detectable by a user.

A device included in or otherwise providing an execution environment may operate in a networked environment communicating with one or more devices via one or more network interface components. The terms "communication interface component" and "network interface component" are used interchangeably. FIG. 10 illustrates network interface adapter (NIA) 1114 as a network interface component included in execution environment 1102 to operatively couple device 1100 to a network. A network interface component includes a network interface hardware (NIH) component and optionally a software component. The terms "network node" and "node" in this document both refer to a device having a network interface component for operatively coupling the device to a network.

Exemplary network interface components include network interface controller components, network interface cards, network interface adapters, and line cards. A node may include one or more network interface components to interoperate with a wired network and/or a wireless network. Exemplary wireless networks include a BLUETOOTH network, a wireless 802.11 network, and/or a wireless telephony network (e.g., a cellular, PCS, CDMA, and/or GSM network). Exemplary network interface components for wired networks include Ethernet adapters, Token-ring adapters, FDDI adapters, asynchronous transfer mode (ATM) adapters, and modems of various types. Exemplary wired and/or wireless networks include various types of LANs, WANs, and/or personal area networks (PANs). Exemplary networks also include intranets and internets such as the Internet.

The terms "device" and "node" as used herein refer to one or more devices and nodes, respectively, providing and/or otherwise included in an execution environment unless clearly indicated otherwise.

As used herein, the term "communication" refers to data for sending, sent, and/or received via a network between communicants. A communication includes a message portion addressed to a receiving communicant. A communication is sent to a communicant to present a message in the message portion to the communicant. The term "communicant" as used herein refers to a user represented in a communication. A communicant or user is represented by a "communications agent" configured to operate in an execution environment, on behalf of the represented communicant, to send data to and/or receive data from another communications agent according to a communications protocol via network. A communications protocol defines and/or otherwise identifies an address space including communications addresses for delivering data sent in a communication from one communications agent to another.

Figure 11:
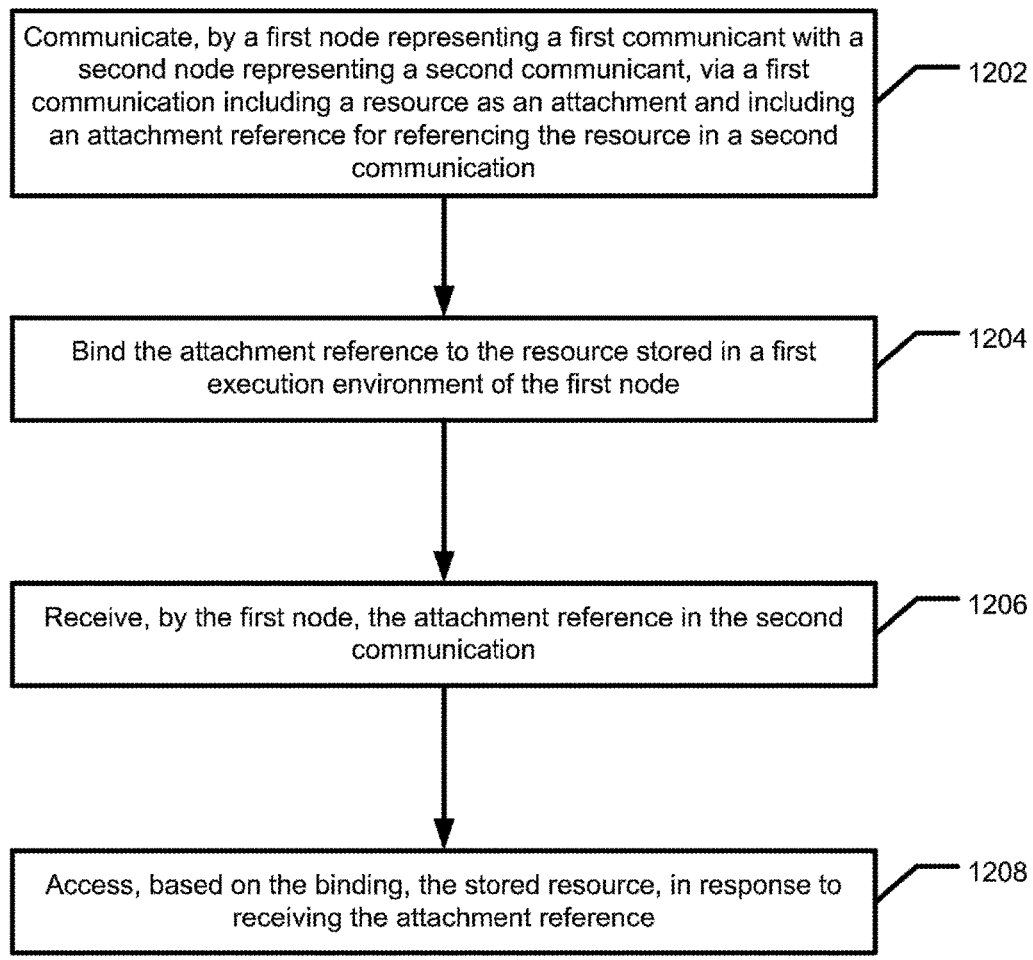
FIG. 11 is a flow diagram illustrating a method for referencing an attachment in a communication according to an aspect of the subject matter described herein.
Figure 12:
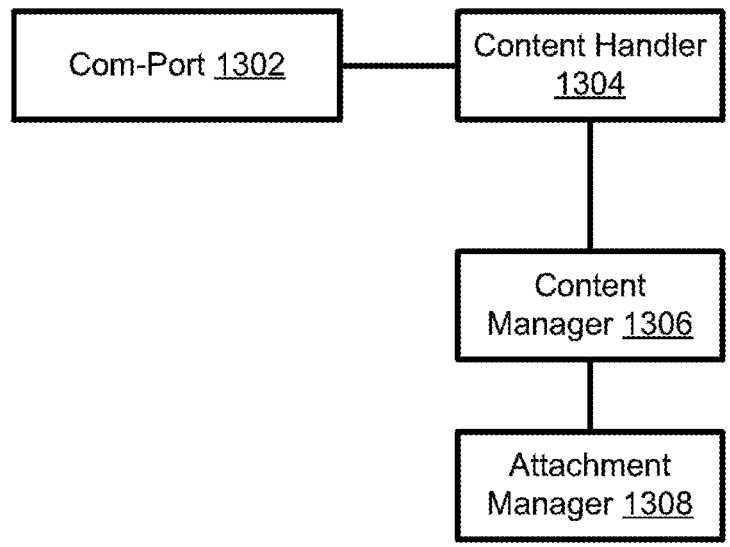
FIG. 12 is a block diagram illustrating an arrangement of components for referencing an attachment in a communication according to another aspect of the subject matter described herein.
Figure 13:
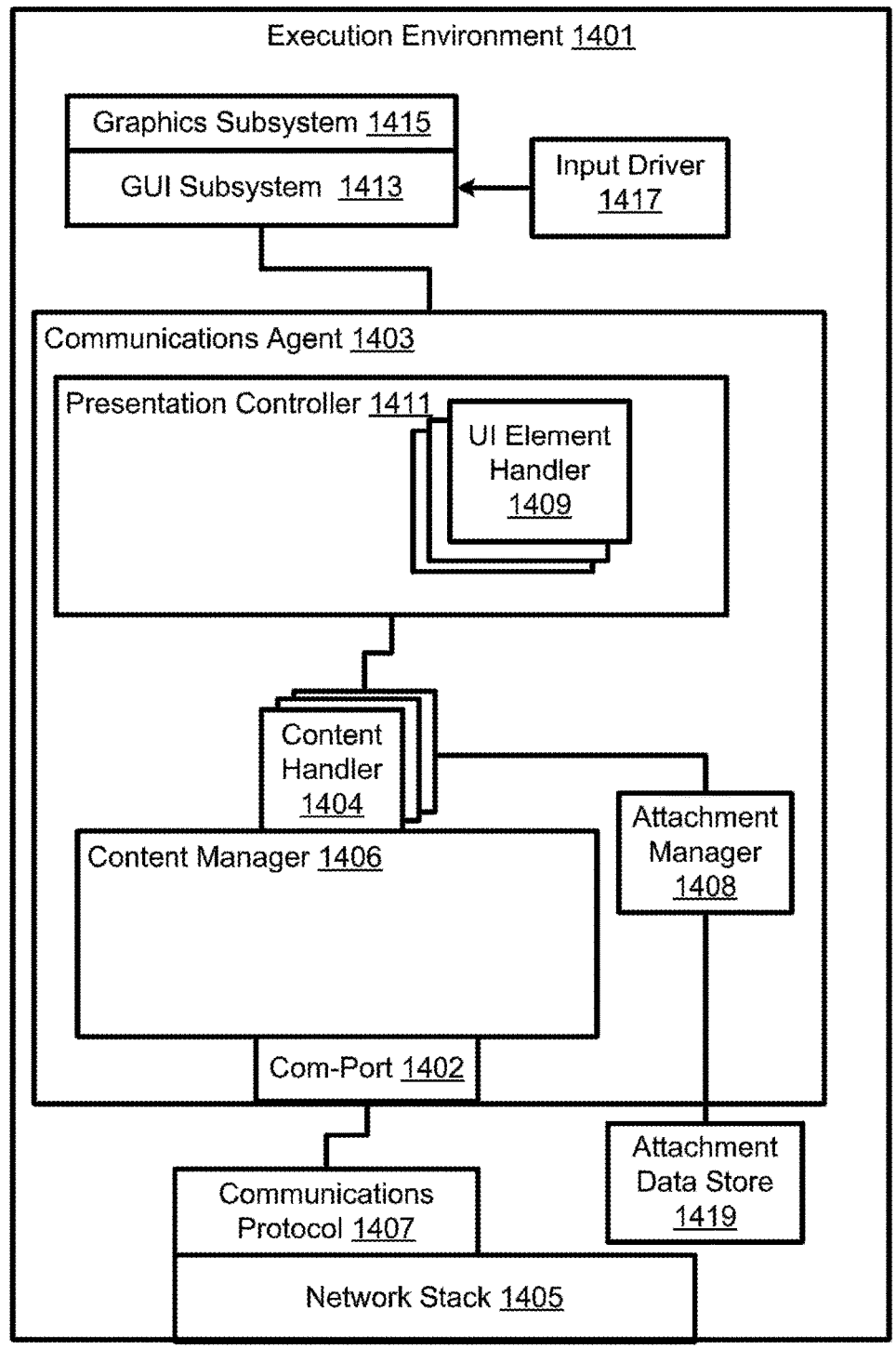
FIG. 13 is a block diagram illustrating an arrangement of components for referencing an attachment in a communication according to another aspect of the subject matter described herein.

The block diagram in FIG. 12 illustrates an exemplary system for referencing an attachment in a communication according to the method illustrated in FIG. 11. A system for performing the method illustrated in FIG. 11 includes an execution environment, including an instruction-processing unit, configured to process an instruction included in at least one of a criterion handler component 1302, a query generator component 1304, a content manager component 1306, and an attachment manager component 1308 illustrated in FIG. 12. Some or all of the exemplary components illustrated in FIG. 12 may be adapted for performing the method illustrated in FIG. 11 in a number of execution environments. FIG. 13 illustrates a block diagram including the components of FIG. 12 and/or analogs of the components of FIG. 12, respectively, adapted for operation in execution environment 1401 including or otherwise provided by one or more nodes.

FIG. 10 illustrates components of an exemplary device that may at least partially provide and/or otherwise be included in an execution environment. The components illustrated in FIG. 13 may be included in or otherwise combined with the components of FIG. 10 to create a variety of arrangements of components according to the subject matter described herein.

Figure 14:
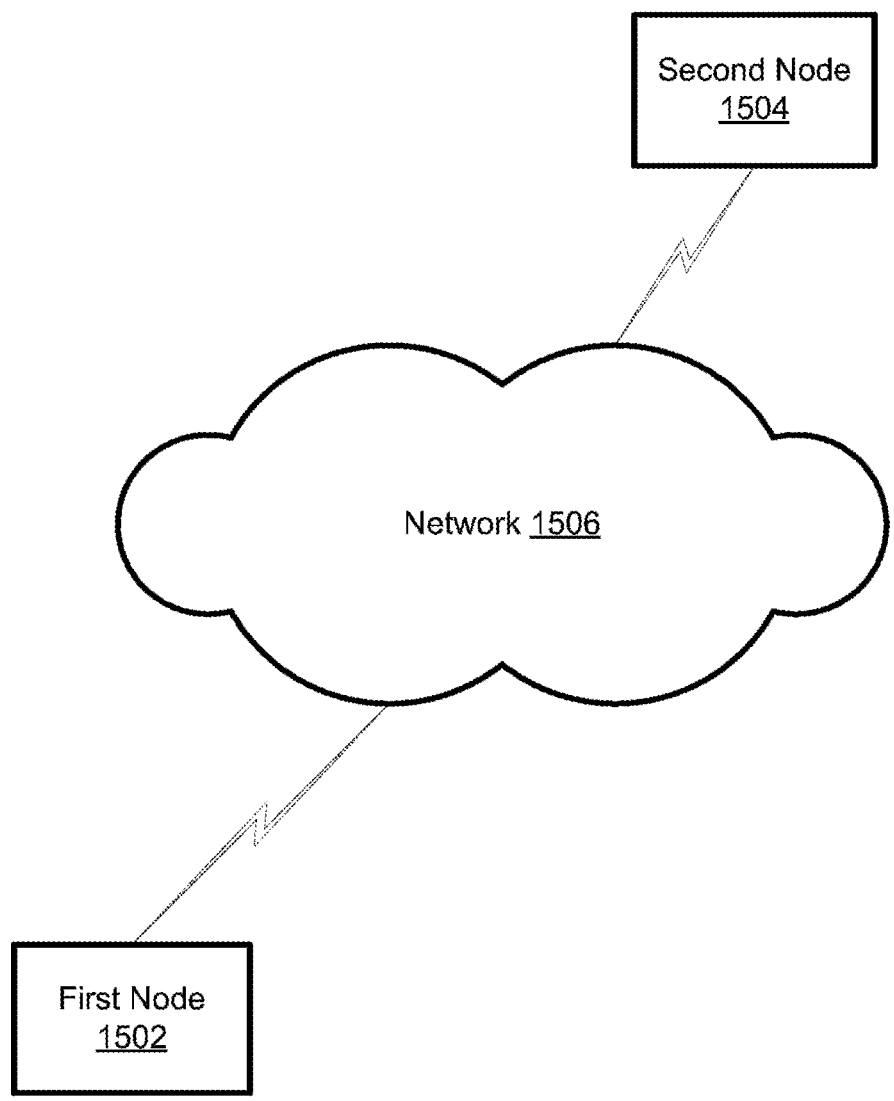
FIG. 14 is a network diagram illustrating an exemplary system for referencing an attachment in a communication according to an aspect of the subject matter described herein.

FIG. 14 illustrates first node 1502 as an exemplary device included in and/or otherwise adapted for providing an instance and/or adaptation of execution environment 1401 in FIG. 13. Second node 1504 also illustrates a device that may be included in and/or otherwise adapted for providing an instance and/or adaptation of execution environment 1401. FIG. 14 also illustrates that first node 1502 and second node 1504 are operatively coupled to network 1506 via respective network interface components enabling first node 1502 and second node 1504 to communicate.

Execution environment 1401 is illustrated in FIG. 13 hosting communications agent 1403. A first instance and/or analog of communications agent 1403 may operate in first node 1502 and a second instance and/or analog may operate in second node 1504. Components in FIG. 13 are referenced for illustrative purposes in describing communications agents operating in an execution environment of first node 1502 and an execution environment of second node 1504. Exemplary communications agents include email clients, phone clients including Voice over Internet Protocol (VoIP) clients, instant messaging clients, short message service (SMS) clients, multimedia message service (MMS) clients, other multimedia communications clients including video phone clients, and other data transfer agents representing users.

FIG. 13 illustrates communications agent 1403 including an adaptation of the arrangement of components in FIG. 12. A first communications agent 1403 may operate, in first node 1502, on behalf of a first communicant to communicate with a second communicant represented by a communications agent operating in second node 1504. Another instance and/or analog of communications agent 1403 may operate in an execution environment of second node 1504 on behalf of the second communicant.

As stated, the various adaptations of the arrangement in FIG. 12 illustrated and described herein are not exhaustive. For example, those skilled in the art will understand based on the description herein that arrangements of components for performing the method illustrated in FIG. 11 may be distributed across more than one node and/or execution environment. For example, such an arrangement may operate at least partially in a communications agent in a user node, such a first node 1502, and at least partially in a server node interoperating with the user node.

FIG. 13 illustrates network stack 1405 for sending and/or receiving data in a communication via network 1506 in FIG. 14. First node 1502 and second node 1504 may be operatively coupled to network 1506 via respective, network interface components. Network stacks 1405 in first node 1502 and second node 1504 may support the same protocol suite, such as TCP/IP, or may communicate via a network gateway or other protocol translation device and/or service.

Communications agents 1403 in FIG. 13, respectively, operating in first node 1502 and in second node 1504 in FIG. 14 may interoperate via their respective network stacks 1405. Communications agents 1403 may communicate via one or more communications protocols. FIG. 13 illustrates communications protocol component 1407 exemplifying a subsystem for exchanging data via network 1506 according to one or more communications protocols, such as simple mail transfer protocol (SMTP), an instant messaging protocol, and/or a real-time voice and/or video protocol such as real-time transport protocol (RTP). A communication between communications agents 1403 in first node 1502 and second node 1504 may include more than one type of data and may use one or more communications protocols for exchanging the one or more types of data via network 506.

Communications agents 1403, in FIG. 13, in first node 1502 and in second node 1504, respectively, may communicate via discrete messages, a request/reply protocol, a data streaming protocol, a session-oriented and/or connection-oriented protocol, a connectionless protocol, a real-time communications protocol, an asynchronous communication, a store and forward communications protocol, a reliable delivery communications protocol, a best-effort delivery communications protocol, a secure protocol and/or an unsecure protocol, to name a few communications options.

FIG. 13 illustrates communications agent 1403 including content manager component 1406. Content manager component 1406 in first node 1502 may interoperate with communications protocol layer component 1407 and/or network stack 1405 to receive data in one or more communications via network 1506 with second node 1504. Content manager component 1406 includes and/or otherwise interoperates with com-port component 402 that operatively couples communications agent 1403 to an interface of communications protocol component 1407 for sending data to and/or receiving data from second node 1504. Second node 1504 may include an adaptation and/or analog of communications agent 1403 including an adaptation and/or analog of com-port component 1402 for receiving data from and/or sending data to first node 1502 in a communication.

Some or all data received in a communication may be included in a message portion, as described above, and/or may be included in one or more attachment portions. A message in the message portion and the one or more attachment portions may include data with corresponding content types that may be different. Exemplary content types include plain text, markup such as hypertext markup language (HTML), audio data, image data, and/or executable data. Executable data may include script instruction(s), byte code, and/or machine code.

In FIG. 13, communications agent 1403 includes one or more content handler components 1404 to process data received according to its content type. A content type may be identified by a MIME type identifier. Exemplary content handler components 1404 include a text/html content handler component for processing HTML representations; an application/xmpp-xml content handler component for processing extensible messaging and presence protocol (XMPP) streams, one or more audio content handler components including and/or configured to retrieve suitable codices; one or more video content handler components for processing video representations of various types; and one or more still image data content handler components for processing various image data content types. Content handler component(s) 1404 process received data representations and may provide transformed data from the representations to one or more user interface element handler components 1409. Alternatively or additionally a content handler component 1404 may provide transformed data to store in a data store for subsequent access.

User interface element handler components 1409 are illustrated in presentation controller component 1411 in FIG. 13. Presentation controller component 1411 may coordinate operation of UI element handler components 1409. Presentation controller component 1411 may manage visual, audio, and other types of output for its including application as well as receive and route detected user and other inputs to components and extensions of its including application, communications agent 1403. With respect to FIG. 13, a user interface element handler component 1409 may be adapted to operate at least partially in a content handler component 1404 such as a text/html content handler component and/or a script content handler component. Additionally or alternatively, a user interface element handler component in execution environment 1401 may be received in a communication. For example, an email may include one or more script instructions.

Figure 15A:
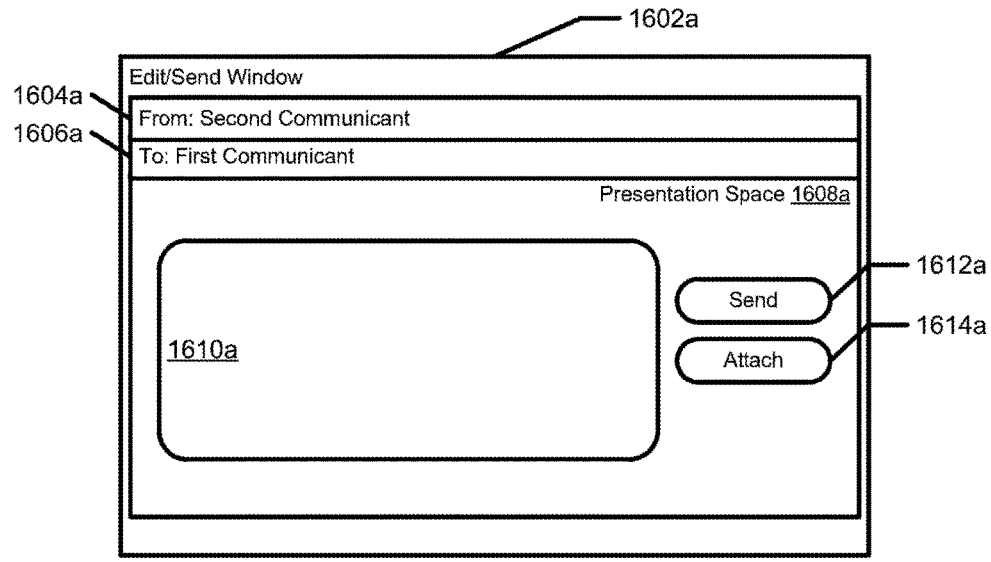
FIG. 15a is a diagram illustrating a user interface presented via a display according to an aspect of the subject matter described herein.

FIG. 15*a* illustrates an exemplary edit/send window 1602*a* that may be presented, by communications agent 1403, in a presentation space of a display device, such as output device 1130 in FIG. 10. Edit/send window 1602*a* includes a from-communicant UI element 1604*a* for presenting a communicant identifier of a communicant. The communicant is represented by communications agent 1403 presenting edit/send window 1602*a*. Edit/send window 1602*a* also includes to-communicant UI element 1606*a* for presenting one or more communicant identifier(s) identifying one or more communicant(s) addressed in the communication and represented by communications agents operating in other nodes, such as the second communicant represented by second node 1504. Presentation space 1608*a* is provided in edit/send window 1602*a* for presenting a message in message UI element 1610*a*. The message is to be sent in the message portion of the communication. Presentation space 1608*a* in FIG. 15*a* also includes one or more control UI elements for managing the communication. Send UI element 1612*a* illustrates an exemplary control UI element for sending the communication to one or more communicants identified in to-communicant UI element 1606*a*. Attach UI element 1614*a* illustrates an exemplary control for including a resource in the communication as an attachment.

The term "attachment" as used herein refers to a portion of a communication that includes data from one communicant to another other than data in a message portion of the communication. A resource sent as an attachment is data that is typically not presented "inline" or in a message included in a message portion of a communication. Email attachments are perhaps the most widely known attachments included in communications. An email attachment is a file or other resource sent along with a message in an email in a portion of the email separate from a message portion. As defined, other types of text communications as well as voice and video communications may include attachment portions. A communication may include one or more resources as one or more attachments.

The components of a user interface are generically referred to herein as user interface elements. More specifically, visual components of a user interface are referred to herein as visual interface elements. A visual interface element may be a visual component of a graphical user interface (GUI). Exemplary visual interface elements include windows, textboxes, sliders, list boxes, drop-down lists, spinners, various types of menus, toolbars, ribbons, combo boxes, tree views, grid views, navigation tabs, scrollbars, labels, tooltips, text in various fonts, balloons, dialog boxes, and various types of button controls including check boxes and radio buttons. An application interface may include one or more of the exemplary elements listed. Those skilled in the art will understand that this list is not exhaustive. The terms "visual representation", "visual component", and "visual interface element" are used interchangeably in this document. Other types of user interface elements include audio output components referred to as audio interface elements, tactile output components referred to as tactile interface elements, and the like.

A "user interface (UI) element handler" component, as the term is used in this document, includes a component configured to send information representing a program entity for presenting a user detectable representation of the program entity by an output device, such as a display. A "program entity" is an object included in and/or otherwise processed by an application or executable program component. The user detectable representation is presented based on the sent information. The sent information is referred to herein as "presentation information". Presentation information may include data in one or more formats including image formats such as JPEG, video formats such as MP4, markup language data such as HTML and other markup based languages, and/or instructions such as those defined by various script languages, byte code, and/or machine code. For example, a voice communication for receiving by a communications agent and/or for sending by a communications agent may be included in a media container having a specified format, such as MPEG4, and may be compressed, encrypted, and/or otherwise encoded. The data is communicated for presenting in and/or by one or more user interface elements included in a user interface of a communications agent and/or a communications agent. Components configured to send information representing one or more program entities for presenting particular types of output by particular types of output devices include visual interface element handler components, audio interface element handler components, tactile interface element handler components, and the like.

A representation of a program entity may be presented and/or otherwise maintained in a presentation space. As used in this document, the term "presentation space" refers to a storage region allocated and/or otherwise provided for storing presentation information, which may include audio, visual, tactile, and/or other sensory data for presentation by and/or on an output device. For example, a buffer for storing an image and/or text string may be a presentation space. A presentation space may be physically and/or logically contiguous or non-contiguous. A presentation space may have a virtual as well as a physical representation. A presentation space may include a storage location in processor memory; secondary storage; a memory of an output device adapter device; and/or a storage medium of an output device. A screen of a display, for example, is a presentation space.

As used herein, the terms "program", "program component", "application", "application component", "executable", and "executable component" refer to any data representation that may be translated into a set of machine code instructions and optional associated program data. Thus, a program or executable may include an application, a shared or non-shared library, and a system command. Program representations other than machine code include object code, byte code, and source code. Object code includes a set of instructions and/or data elements that either are prepared for linking prior to loading or are loaded into an execution environment. When in an execution environment, object code may include references resolved by a linker and/or may include one or more unresolved references. The context in which this term is used will make clear that state of the object code when it is relevant. This definition includes machine code and virtual machine code, such as Java™ byte code.

Various user interface elements that are illustrated in FIG. 15a are presented by one or more user interface (UI) element handler components 1409 in presentation controller component 1411 in FIG. 13. UI element handler component(s) 1409 may send presentation information representing visual interface element(s), such as from-communicant UI element 1604a in FIG. 15a, to GUI subsystem 1413. GUI subsystem 1413 may instruct graphics subsystem 1415 to draw the visual interface element(s) in a presentation space of an output device included in execution environment 1401 of a node based on the presentation information received in and/or generated from data received in the communication.

Input may be received via input driver 1417 in FIG. 13. For example, a user may move a mouse to move a pointer presented in a display of first node 1502 over send UI element 1612a. The user may provide an input detected by the mouse. The detected input may be received by GUI subsystem 1413 via input driver 1417 as a send command indicator based on the association of the shared location of the pointer and the send UI element 1612a in the presentation space of the display.

Data to send in a communication to a remote communications agent may be received by one or more content handler component(s) 1404 to transform the data into one or more representations suitable for transmitting in the communication and/or suitable for processing by the remote communications agent. The one or more data representations may be provided to content manager component 1406 to send in the communication. Content manager component 1406 may format, encode, and/or otherwise transform the one or more data representations according to a communications protocol supported by communications protocol component 1407. Content manager component 1406 may alternatively or additionally encode and/or otherwise transform one or more of the data representations for sending in a data stream such as voice stream and/or a video stream for communicating in the communication to the remote communications agent.

Content manager component 1406 may provide the transformed data to communications protocol component 1407 via com-port component 1402. Communications protocol component 1407 may further format, encode, and/or otherwise transform the data to send via network stack 1405 for delivery via network 1506 to a node including a communications agent representing a communicant addressed in the communication.

With reference to FIG. 11, block 1202 illustrates that the method includes communicating, by a first node representing a first communicant with a second node representing a second communicant, via a first communication including a resource as an attachment and including an attachment reference for referencing the resource in a second communication. Accordingly, a system for referencing an attachment in a communication includes means for communicating, by a first node representing a first communicant with a second node representing a second communicant, via a first communication including a resource as an attachment and including an attachment reference for referencing the resource in a second communication. For example, as illustrated in FIG. 12, criterion handler component 1302 is configured for communicating, by a first node representing a first communicant with a second node representing a second communicant, via a first communication including a resource as an attachment and including an attachment reference for referencing the resource in a second communication. FIG. 13 illustrates criterion handler component 1402 as an adaptation and/or analog of criterion handler component 1302 in FIG. 12. One or more criterion handler components 1402 operate in execution environment 1401.

In an aspect, communicating via a communication may include sending the communication. First node 1502 may send a communication including a resource as an attachment and including an attachment reference. A first communicant may identify a second communicant to include in a communication. The first communicant may be represented by communications agent 1403 operating in execution environment 1401 including and/or provided by first node 1502. The second communicant may be represented by a communications agent operating in second node 1504. For example, an identifier of the first communicant may be received as input from the first communicant. The identifier may be received to initiate and/or otherwise include the second communicant in a communication.

A message addressed to the second communicant may be received based on input from the first communicant. Edit/send window 1602a illustrates a user interface element for creating and editing communications. The received message input may be presented in message UI element 1610a. The first communicant may identify a resource to include in the communication as an attachment. User input corresponding to attach UI element 1614a in FIG. 15a may be detected by presentation controller component 1411 and/or a UI element handler component 1409 for attach UI element 1614a. Communications agent 1403 may present a file system navigation dialog to receive user input to locate a file to include in the communication. A resource to include in a communication may be identified in a variety of ways, in various aspects. For example, a resource may be identified in response to a user dragging and dropping a representation of a resource over edit/send window 1602a.

A resource identified for including in a communication may be identified by presentation controller component 1411 to attachment manager component 1408. Attachment manager component 1408 may create a copy of the resource in a data store illustrated by attachment data store 1419 in FIG. 13. In another aspect, attachment manager component 1408 may store a reference to the resource in attachment data store 1419. The resource copy may be stored in the communication or a portion of the communication.

Attachment manager component 1408 may generate and/or otherwise identify an attachment reference for the resource. In an aspect, an attachment reference or a portion of an attachment reference may be received from a user. A user may provide an identifier that is memorable to the user and/or to the communicant to whom the communication is to be sent. An attachment reference may be associated with a user-friendly alias and/or symbol that may be easy for the user to recognize and/or recall.

The attachment reference may be a shared identifier exchangeable between first node 1502 and second node 1504 for referencing the resource from a second communication. An attachment reference may reference a location in a data store in an execution environment of a node including the resource. Nodes in a communication may maintain their own copy of a resource identified by a shared attachment reference.

Attachment manager component 1408 may provide the attachment reference and optionally an attachment alias to a content handler component 1404 based on the content type of the attachment reference and/or based on a content type of the resource or a portion of the resource. As described above, one or more content handler components 1404 process data to be sent in a communication and/or portions of the data to generate a representation of the data or representations of portions of the data suitable for including in a communication according to a communications protocol for delivering the communication to a node identified by a communications address of a communicant to receive the communication.

In response to an indication to initiate a communication and/or to otherwise send data in a communication, message data whether voice, text, and/or image data may be sent by communications agent 1403 via communications protocol component 1407 for delivery to the second communications agent representing the identified second communicant. For example, a user input corresponding to send button 1612a in FIG. 15a may be received by presentation controller component 1411 via input driver 1417 and GUI subsystem 1413 as described above. Presentation controller 1411 may provide one or more portions of data to send in the communication to one or more content handlers 1404 according to the content types of the data in the one or more portions. For example, a text message may be provided to a text/plain content handler 1404 for processing content types having text/plain and/or text/* MIME type identifiers.

FIG. 16a illustrates email communication 1700a. Email communication 1700a is illustrated formatted as multipart/mixed content including attachment portion 1702a. Attachment portion 1702a illustrates content-accessor entity header 1704a including "jj@somemail.net; Aj347W4" as an attachment reference. FIG. 16a illustrates message portion 1706a including a message addressed to the second communicant.

In another aspect, an attachment reference may be included in a portion separate from a corresponding attachment portion. The attachment reference portion may be identified as including an attachment reference based on, for example, its location in a communication and/or based on a content type identifier for the attachment reference portion.

Content manager component 1406, as described above, may provide the communication and/or one or more data representations to include in the communication to com-port component 1402. Com-port component 1402 may communicate with second node 1504 via the communication by sending the communication including the resource and including the attachment reference via network 1506 for delivery to second node 1504. Com-port component 1402 may send the communication by interoperating with communications protocol component 1407 to transmit the communication via network stack 1405 for delivery to second node 1504.

In another aspect, a node may communicate via a communication by receiving the communication via a network from another node. First node 1502 may receive a communication via network 1506 from second node 1504. A resource, such as a document, may be included as an attachment in the communication. The communication may include a message addressed to a first communicant represented by first node 1502. The communication also includes an attachment reference for the attached resource.

Com-port component 1402 operating in execution environment 1401 included in and/or provided by first node 1502 may receive a communication including a resource as an attachment and including an attachment reference via network 1506 from second node 1504. The communication may be received in one or more packets via network stack 1405 and communications protocol component 1407. Com-port component 1402 may provide the data to content manager component 1406. Content manager component 1406 may determine one or more content types of the data. The content and/or portions of the content may be provided to one or more content handler components 1404 based on the one or more content types. For example, FIG. 16a illustrates message portion 1706a including "text/plain" MIME type identifier 1708a as a content type identifier. The message in message portion 1706a may be provided to a text/plain content handler 1404. Audio data in a voice communication may be provided to an audio content handler component 1404, and video data in a video communication may be provided to a video content handler component 1404.

Content manager component 1406 may detect content type information described above to detect an attachment portion of a communication. For example, the content illustrated in FIG. 16a may be received in a communication. Content manager component 1406 may detect message portion 1706a and content type entity header 1708a identifying the content type of the data in message portion 1706a by "text/plain" MIME type identifier. An "image/jpeg" MIME type identifier in content type entity header 1710a identifies the data in attachment portion 1702a as image data represented according to a JPEG specification. Content manager component 1406 may identify attachment portion 1702a based on its location in communication 1700a and/or based on its content type.

Content manager component 1406 and/or a content handler component 1404 compatible with the content type of attachment portion 1702a may identify content-accessor entity header 1704a as including attachment reference "jj@somemail.net; Aj347W4".

Returning to FIG. 11, block 1204 illustrates that the method further includes binding the attachment reference to the resource stored in a first execution environment of the first node. Accordingly, a system for referencing an attachment in a communication includes means for binding the attachment reference to the resource stored in a first execution environment of the first node. For example, as illustrated in FIG. 12, query generator component 1304 is configured for binding the attachment reference to the resource stored in a first execution environment of the first node. FIG. 13 illustrates query generator component 1404 as an adaptation and/or analog of query generator component 1304 in FIG. 12. One or more query generator components 1404 operate in execution environment 1401.

An attachment reference may be associated with and/or otherwise bound to a resource received in an attachment in various ways. In an aspect, a record may be created that identifies the attachment reference and identifies access information for accessing the resource from a data store. Whether communications agent 1403 in first node 1502 sends a communication including an attachment or receives a communication including an attachment, the communication or portions of the communication may be stored in a data store in and/or otherwise accessible to execution environment 1401. For example, text/plain content handler component 1404 may transform a representation of the message in message portion 1706a into a storable representation and provide the storable representation to a message manager (not shown) to store in a data store, such as attachment data store 1419 and/or a data storage medium including and/or included in attachment data store 1419. An "image/jpeg" content handler component 1404 may provide a storage representation of the resource in attachment portion 1702a to attachment manager component 1408 to store in attachment data store 1419. Attachment manager component 1408 may receive the attachment reference from the content handler component and store the attachment reference with the storage representation of the resource in addition to or instead of creating a record binding the attachment reference with the resource.

Note that while, in an aspect, a communication and/or a message in the communication may be identified based on an attachment reference in the communication, a resource in the communication may be located based on the attachment reference without locating the message and/or other portions of the communication in which the resource was sent and/or received as an attachment.

An attachment alias may also be stored. An attachment alias may be stored so that the attachment reference for the attachment alias may be located based on the attachment alias. The attachment alias may be easier for a communicant to remember and/or otherwise manage. Analogously, an attachment reference may be stored so that an attachment alias for the attachment reference may be located based on the attachment reference and/or vice versa. The resource bound to the attachment reference may be located based on the attachment reference.

Returning to FIG. 11, block 1206 illustrates that the method yet further includes receiving, by the first node, the attachment reference in the second communication. Accordingly, a system for referencing an attachment in a communication includes means for receiving, by the first node, the attachment reference in the second communication. For example, as illustrated in FIG. 12, content manager component 1306 is configured for receiving, by the first node, the attachment reference in the second communication. FIG. 13 illustrates content manager component 406 as an adaptation and/or analog of content manager component 1306 in FIG. 12. One or more content manager components 1406 operate in execution environment 1401.

Whether a node is a sender of a communication including a resource as an attachment and an attachment reference or a receiver of the communication, the node may receive a second communication including the attachment reference. First node 1502 may receive a second communication including an attachment reference for a resource communicated in a first communication. First node 1502 may receive the second communication before, during, and/or after the first communication is communicated. When the second communication is received before the first communication, the attachment reference is predetermined prior to communicating the resource as an attachment. The first and second communicants may exchange information referencing the resource before the resource is communicated.

Figure 16B:
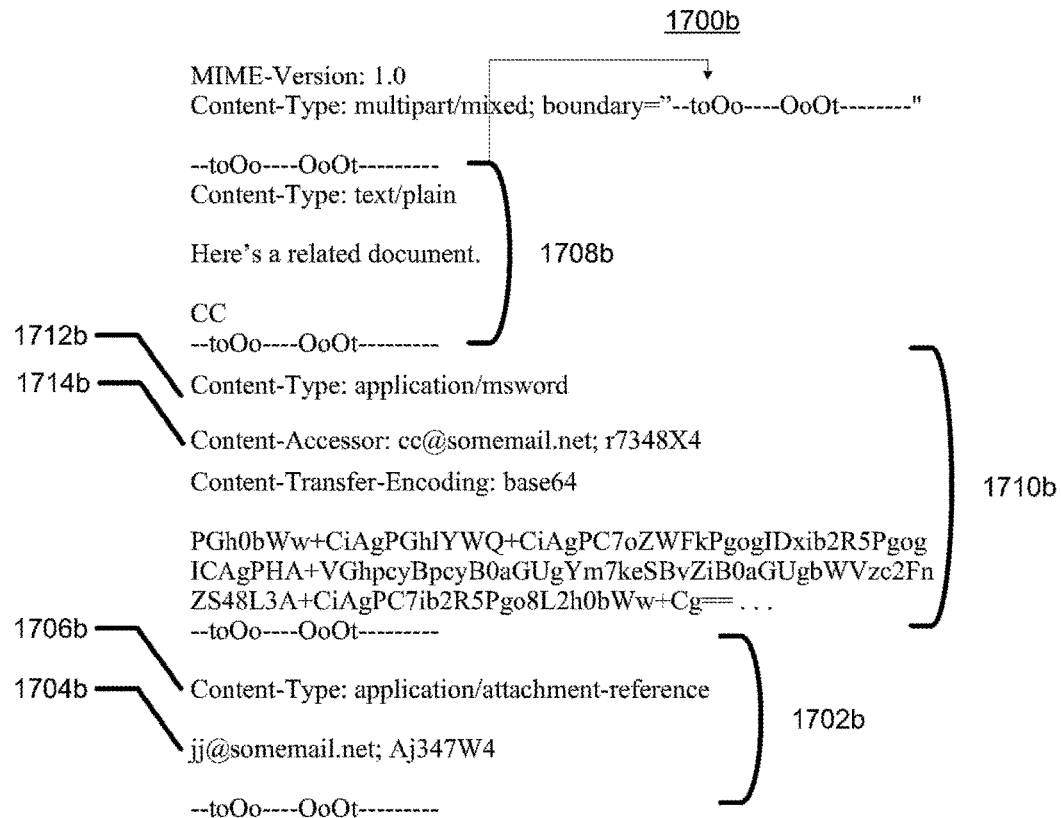
FIG. 16b illustrates an exemplary communication between a first node and a second node according to an aspect of the subject matter described herein.

FIG. 16*b* illustrates second communication 1700*b* including attachment reference portion 1702*b* identifying the attachment reference "jj@somemail.net; Aj347W4" as content 1704*b* having an "application/attachment-reference" MIME type identifier identifying the content type in content type entity header 1706*b*. Attachment reference "jj@somemail.net; Aj347W4" is the same identifier included in content-accessor entity header 1704*a* in first communication 1700*a* in FIG. 16*a*. In an aspect, an alias identifying the attachment reference may be included in addition to and/or instead of including the attachment reference.

FIG. 16*b* also illustrates that second communication 1700*b* includes a message portion 1708*b*, and attachment portion 1710*b* including a resource with a content type identified in content-type entity header 1712*b* by "application/msword" MIME type identifier. FIG. 16*b* also illustrates attachment portion 1710*b* including an attachment reference "cc@somemail.net; r7348X4" in content-accessor entity header 1714*b* for the resource in attachment portion 1710*b*. Attachment portion 1710*b*, attachment reference "cc@somemail.net; r7348X4", and the resource represented in attachment portion 1710*b* may be processed as described above.

Returning to FIG. 11, block 1208 illustrates that the method yet further includes accessing, based on the binding, the stored resource, in response to receiving the attachment reference. Accordingly, a system for referencing an attachment in a communication includes means for accessing, based on the binding, the stored resource, in response to receiving the attachment reference. For example, as illustrated in FIG. 12, attachment manager component 1308 is configured for accessing, based on the binding, the stored resource, in response to receiving the attachment reference. FIG. 13 illustrates attachment manager component 1408 as an adaptation and/or analog of attachment manager component 1308 in FIG. 12. One or more attachment manager components 1408 operate in execution environment 1401.

In an aspect, content manager component 1406 operating in execution environment 1401 including and/or provided by first node 1502 may receive the attachment reference in attachment reference portion 1702*b* in second communication 1700*b*. Content manager 1406 may provide data in attachment reference portion 1702*b* to a content handler component 1404 configured to process data represented according to a schema identified by "application/attachment-reference" MIME type identifier included in content-type entity header 1706*b* in attachment reference portion 1702*b*. The "application/attachment-reference" content handler component 1404 in one aspect may automatically access the resource received in first communication 1700*a* in response to receiving the attachment reference in attachment reference portion 1702*b*. The "application/attachment-reference" content handler component 1404 may provide the attachment reference to attachment manager component 1408. Attachment manager component 1408 may locate the resource or a copy of the resource in a data store in execution environment 1401, such as the data store illustrated by attachment data store 1419. A copy of a resource and the original resource are herein considered equivalents. Either may be referred to the resource.

The "application/attachment-reference" content handler component 1404 may generate presentation information to present, via an output device in a UI element in execution environment 1401. In another aspect, rather than accessing the resource automatically, "application/attachment-reference" content handler component 1404 may provide presentation information for a UI element for receiving a user input for accessing the resource based on the attachment reference. Referenced attachment UI element 1608*b* in FIG. 15*b* illustrates a UI element for accessing a resource via an attachment reference.

Figure 15B:
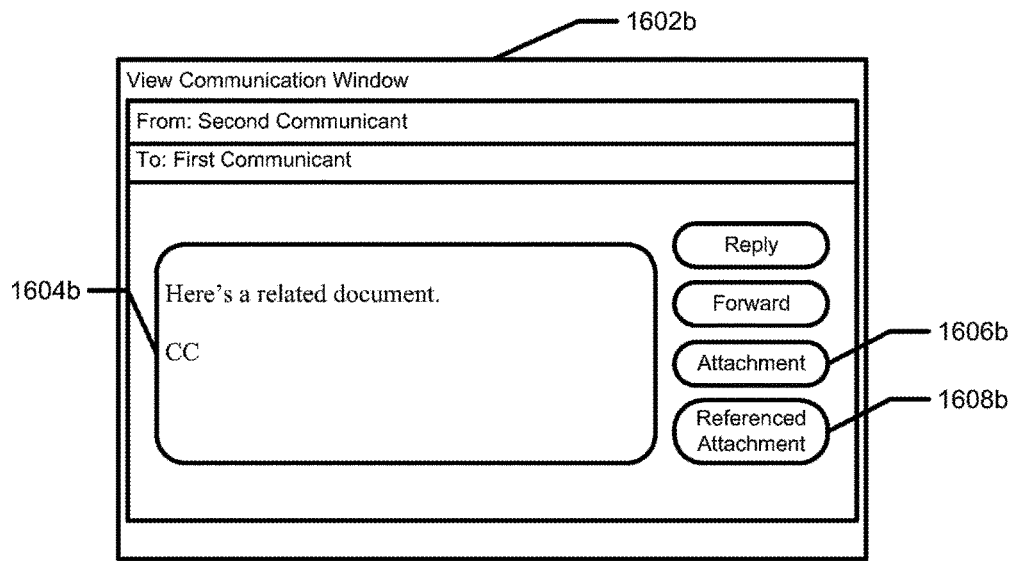
FIG. 15b is a diagram illustrating a user interface presented via a display according to an aspect of the subject matter described herein.

FIG. 15*b* illustrates view communication window 1602*b* presented by presentation controller component 1411 and/or one or more UI element handler components 1409 to present a view of the message in message portion 1708*b* in FIG. 16*b* received in second communication 1700*b*. The view may be presented in message UI element 1604*b* in FIG. 15*b*. View communication window 1602*b* is illustrated including attachments UI control 1606*b*. In response to detecting a user input corresponding to attachment UI control 1606*b*, presentation controller component 1411 and/or one or more UI element handler components 1409 may send presentation information to present the resource in attachment portion 1710*b* in second communication 1700*b* in FIG. 16*b*.

In response to detecting a user input corresponding to referenced attachment UI control 1608b, presentation controller component 1411 and/or one or more UI element handler components 1409 may send the attachment reference received in attachment reference portion 1702b to attachment manager component 1408 to retrieve the identified resource received in attachment portion 1702a in communication 1700a in FIG. 16a. Attachment manager component 1408 may return the resource to presentation controller component 1411, and/or one or more UI element handler components 1409 may be instructed to send presentation information to present the resource included in attachment portion 1702a in FIG. 16a via an output device. Attachment manager component 1408 and/or presentation controller component 1411 may provide the resource to one or more suitable content handler components 1404 to generate the presentation information for the referenced resource. In an aspect, the resource may be pre-fetched prior to receiving input corresponding to referenced attachment UI control 1608b.

Figure 15C:
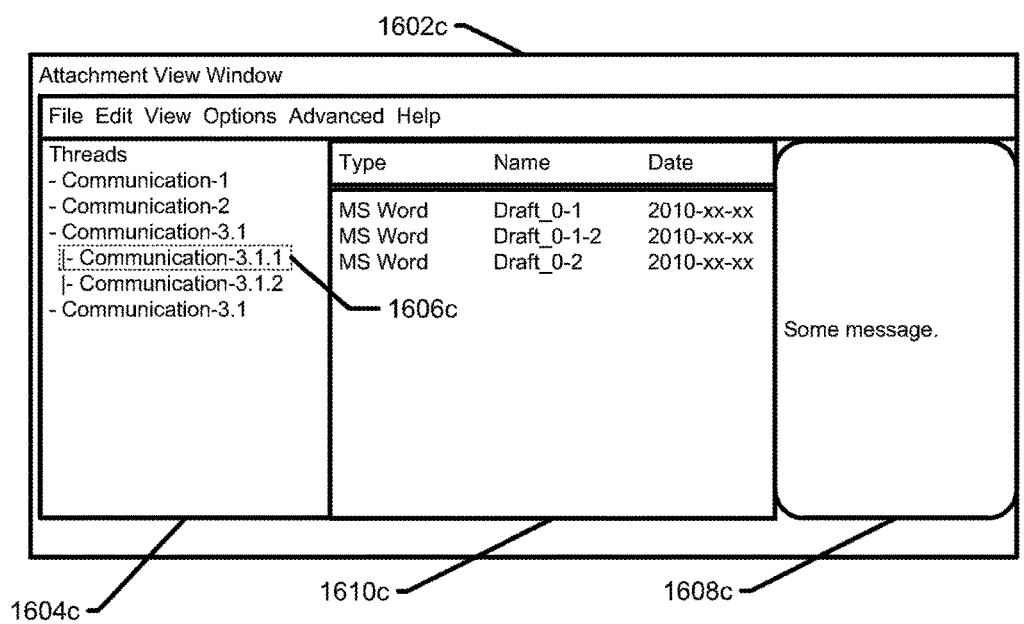
FIG. 15c is a diagram illustrating a user interface presented via a display according to an aspect of the subject matter described herein.

FIG. 15c illustrates attachment view window 1602c presenting a view of messages received in various communications organized by message thread in thread UI element 1604c. A box surrounding a communication identified as communication-3.1.1 1606c indicates communication-3.1.1 1606c is currently selected. FIG. 15c illustrates message view UI element 1608c for presenting a message included in the currently selected communication. Attachment view window 1602c includes an attachments UI element 1610c for presenting selectable representations of resources communicated in communication-3.1.1 1606c and/or identified in communication-3.1.1 1606c by attachment references identifying resources included as attachments communicated in other communications. Attachments UI element 1610c illustrates 3 versions of a document exchanged in various communications including communication-3.1.1 1606c.

The method illustrated in FIG. 11 may include additional aspects supported by various adaptations and/or analogs of the arrangement of components in FIG. 13. In various aspects a first communication including a resource as an attachment and including an attachment reference and/or second communication including the attachment reference may include a text-based message, an audio-based message, and/or an image-based message, such as video. More particularly, the first communication and/or the second communication may include an email, an instant message, a short message service (SMS) message, a multimedia message service (MMS) message, a phone call, and/or a video call.

Application Ser. No. 12/833,014 filed on 2010 Jul. 9, entitled "Methods, Systems, and Program Products for Processing a Request for a Resource in a Communication" describes methods and systems for requesting a resource in a communication. In an aspect, attachment information identifying a resource to include as an attachment may be received in response to and/or otherwise based on a request received by first node 1502 in a prior communication from second node 1504.

An attachment reference generated by attachment manager component 1408 and/or based on input received from a user of communications agent 1403 may be based on the first communicant, the second communicant, the first node, the second node, a communications address in the first communication, a schema defining at least one of a format and vocabulary for the resource, a time, a location, a file name, a key for a database table, a tag, a keyword, another version of the resource, a task, a role of the resource in a task, and/or a state of the resource.

An attachment reference may be associated with a resource stored in a data store in execution environment 1401 by associating the attachment reference with an address and/or other identifier of a location in the data store of some or all of the resource. The location may be identified by a file name in a hierarchical system of file folders. Other data stores, such as LDAP directories, identify locations based on identifiers from a hierarchical name space and are suitable for storing a resource received as an attachment in a communication. An identifier of a storage location of a resource may be generated from an attachment reference, include an attachment reference, identify an attachment reference, and/or otherwise be based on an attachment reference.

In an aspect, the second communication received by first node 1502 may be received from the second node 1504 as described above. In another aspect, a third node may receive the attachment reference in a communication with first node 1502, second node 1504, and/or another node that has communicated with one or both of first node 1502 and second node 1504. The second communication received by first node 1502 may be received from the third node.

The second communication in the method illustrated in FIG. 11 may include a message in message portion 1708b in FIG. 16b included as a reply to a first message in the first communication. In another aspect, the second communication may include a message portion that is empty and/or otherwise includes no message to present to the first communication represented by first node 1502. In still another aspect, described above, the second communication may not be a reply and/or include a message that is a reply to the first communication and/or to a message included in the first communication. The second message may include a message in a message portion or may include a message portion with no message for the receiving communicant.

FIG. 16a illustrates that an attachment reference may be included in an attachment portion. Alternatively or additionally, an attachment reference may be included in a portion of a communication that is separate from the attachment portion including the attachment the attachment reference identifies. FIG. 16a and FIG. 16b illustrate that an attachment reference may be included in and/or otherwise identified in a header in a communication. The header may be defined to include and/or identify an attachment reference. Further FIG. 16b illustrates that an attachment reference may be identified based on a content type identifier, such as a MIME type identifier, defined to identify particular content as including an attachment reference. FIG. 16a and FIG. 16b both illustrate that an attachment reference may be included in a communication in a portion of the communication separate from a message portion of the communication.

An attachment reference may be detected in a communication based on its location in the communication. For example, an attachment reference portion of a communication may be specified to immediately follow the message portion of the communication. Alternatively or additionally, an attachment reference may be detected based on a keyword defined for identifying an attachment reference, such as the content-accessor entity header 1704a in FIG. 16a and/or content-type entity header 1706b in FIG. 16b.

In another aspect, first node 1502 may send a third communication including the attachment reference included in the first communication, via network 1506, for delivery to second node 1504. First node 1502 may send the third communication whether first node is the sender or the receiver of the first communication. The attachment reference is sent in the third communication for accessing, by the second communicant, the resource stored in an execution environment of second node 1504.

In an aspect, a resource in a communication may be detected as a duplicate of a resource in another communication. In FIG. 13, attachment manager component 1408 may detect and/or otherwise identify duplicate resources. For a node sending the communication, the attachment reference of the resource may be sent rather than sending the duplicate. Attachment manager component 1408 may identify the duplicate to content manager component 1406. Content manager component 1406 may include and/or provide for including the attachment reference rather than the duplicate resource in the communication. The sender and/or receiver of a duplicate resource may store a single copy of the resource. When attachment manager component 1408 detects a duplicate, attachment manager component 1408 may combine two attachment references into one referencing a single copy of a resource. In another aspect, attachment manager component 1408 may associate more than one attachment reference with a resource in order to avoid duplicate stored copies.

To the accomplishment of the foregoing and related ends, the descriptions and annexed drawings set forth certain illustrative aspects and implementations of the disclosure. These are indicative of but a few of the various ways in which one or more aspects of the disclosure may be employed. The other aspects, advantages, and novel features of the disclosure will become apparent from the detailed description included herein when considered in conjunction with the annexed drawings.

It should be understood that the various components illustrated in the various block diagrams represent logical components that are configured to perform the functionality described herein and may be implemented in software, hardware, or a combination of the two. Moreover, some or all of these logical components may be combined, some may be omitted altogether, and additional components may be added while still achieving the functionality described herein. Thus, the subject matter described herein may be embodied in many different variations, and all such variations are contemplated to be within the scope of what is claimed.

To facilitate an understanding of the subject matter described above, many aspects are described in terms of sequences of actions that may be performed by elements of a computer system. For example, it will be recognized that the various actions may be performed by specialized circuits or circuitry (e.g., discrete logic gates interconnected to perform a specialized function), by program instructions being executed by one or more instruction-processing units, or by a combination of both. The description herein of any sequence of actions is not intended to imply that the specific order described for performing that sequence must be followed.

Moreover, the methods described herein may be embodied in executable instructions stored in a computer-readable medium for use by or in connection with an instruction execution machine, system, apparatus, or device, such as a computer-based or processor-containing machine, system, apparatus, or device. As used here, a "computer-readable medium" may include one or more of any suitable media for storing the executable instructions of a computer program in one or more of an electronic, magnetic, optical, electromagnetic, and infrared form, such that the instruction execution machine, system, apparatus, or device may read (or fetch) the instructions from the computer-readable medium and execute the instructions for carrying out the described methods. A non-exhaustive list of conventional exemplary computer-readable media includes a portable computer diskette; a random access memory (RAM); a read only memory (ROM); an erasable programmable read only memory (EPROM or Flash memory); optical storage devices, including a portable compact disc (CD), a portable digital video disc (DVD), a high definition DVD (HD-DVD™), a Blu-ray™ disc; and the like.

Thus, the subject matter described herein may be embodied in many different forms, and all such forms are contemplated to be within the scope of what is claimed. It will be understood that various details may be changed without departing from the scope of the claimed subject matter. Furthermore, the foregoing description is for the purpose of illustration only, and not for the purpose of limitation, as the scope of protection sought is defined by the claims as set forth hereinafter.

All methods described herein may be performed in any order unless otherwise indicated herein explicitly or by context. The use of the terms "a" and "an" and "the" and similar referents in the context of the foregoing description and in the context of the following claims are to be construed to include the singular and the plural, unless otherwise indicated herein explicitly or clearly contradicted by context. The foregoing description is not to be interpreted as indicating that any non-claimed element is essential to the practice of the subject matter as claimed.

I claim:

1. A computer-implemented method, comprising:

creating at least a portion of an instant messaging network service application that is configured to cooperate with a device including a touchscreen and a client instant messaging application, the client instant messaging application, when executed, is configured to cause the device to:

display, via the touchscreen, an instant messaging interface including a text entry user interface element for receiving entered text, and one or more user interface elements for causing requests to be sent that are valid according to a criterion schema defining at least one of a format or a vocabulary, the one or more user interface elements including a first menu item with corresponding first text, wherein the instant messaging network service application, when executed, is configured to cause an apparatus to:

based on a touch selection on the first menu item with corresponding first text: receive, at the apparatus from the device and with a communicant identifier associated with a user of the client instant messaging application, a first request that is valid according to the criterion schema defining at least one of the format or the vocabulary, after receiving, at the apparatus from the device and with the communicant identifier associated with the user of the client instant messaging application, the first request that is valid according to the criterion schema defining at least one of the format or the vocabulary: send, from the apparatus to the device and with the communicant identifier associated with the user of the client instant messaging application, a first response for causing display, via the instant messaging interface, of at least one first image that is automatically identified by the apparatus based on the first request, based on entry, via the text entry user interface element of the instant messaging interface, of the entered text:

receive, at the apparatus from the device and with the communicant identifier associated with the user of the client instant messaging application, a second request that is valid according to the criterion schema defining at least one of the format or the vocabulary, and after receiving, at the apparatus from the device and with the communicant identifier associated with the user of the client instant messaging application, the second request that is valid according to the criterion schema defining at least one of the format or the vocabulary:

send, from the apparatus to the device and with the communicant identifier associated with the user of the client instant messaging application, a second response for causing display, via the instant messaging interface, of content that is automatically identified by the apparatus based on the second request, the content being based on a user profile of the user of the client instant messaging application; and causing storage of the at least portion of the instant messaging network service application.

2. The computer-implemented method of claim 1, wherein the instant messaging network service application is configured such that the content is automatically identified based on the second request, by performing a matching operation with only a portion of the entered text, where the portion of the entered text is part of a query entered by the user.

3. The computer-implemented method of claim 1, wherein the instant messaging network service application is configured such that the at least one first image is automatically identified by the apparatus based on the first request and the user profile of the user of the client instant messaging application.

4. The computer-implemented method of claim 1, wherein the instant messaging network service application is configured such that, based on the touch selection on the first menu item with corresponding first text, the apparatus is preconfigured to only cause the at least one first image to be displayed, in response to the first request; and is further preconfigured to only cause the content to be displayed, in response to the second request.

5. The computer-implemented method of claim 1, wherein at least one of: the at least one first image is stored by a system that is separate from the apparatus and separate from the device and the at least one first image is caused to be displayed by causing the at least one first image to be accessed via the system; or the content is stored by the system that is separate from the apparatus and separate from the device and the content is caused to be displayed by causing the content to be accessed via the system.

6. The computer-implemented method of claim 1, wherein the at least one first image is displayed via the instant messaging interface via a balloon.

7. The computer-implemented method of claim 1, wherein the at least one first image is a plurality of images that are displayed via the instant messaging interface using a user interface element that is capable of a sliding function.

8. The computer-implemented method of claim 1, wherein the at least one first image is a plurality of images that are displayed via the instant messaging interface in a plurality of balloons that are capable of a sliding function.

9. The computer-implemented method of claim 1, wherein the at least one first image is a plurality of images that are each displayed with a corresponding menu with at least one particular menu item via the instant messaging interface and are capable of a sliding function.

10. The computer-implemented method of claim 9, wherein at least one of:
the at least portion of the client instant messaging application includes an entirety of the client instant messaging application;
the at least portion of the instant messaging network service application includes an entirety of the instant messaging network service application;
the device includes at least one of a personal computer, a consumer electronic device, or a mobile device;
the at least portion of the client instant messaging application is created by a development thereof;
the at least portion of the instant messaging network service application is created by a development thereof;
the client instant messaging application is configured to cooperate with the apparatus by communicating with the apparatus;
the client instant messaging application is configured such that interaction therewith is capable of invoking a network browser application;
the apparatus includes at least one of one or more servers, or one or more relays;
the apparatus and the device are equipped with respective communications agents;
the communicant identifier includes at least one of a contactor identifier or a contactee identifier;
in each instance of the displaying, the displaying occurs in immediate response to the receiving;
in each instance of the displaying, the displaying occurs after at least one intermediate operation that occurs in immediate response to the corresponding receiving;
the first menu item includes a control that initiates a command in response to a user selection thereon;
the first menu item includes a hyperlink;
selection on the first menu item results in a call;
the first menu item is constructed using a mark-up language;
the first menu item is received as a message attachment;
the first menu item is associated with a uniform resource locator;
the first menu item includes the corresponding first text;
the first menu item is the only menu item of a menu;
the first menu item is one of a plurality of menu items of a menu;
the selection on the first menu item does not invoke a network browser application;
the selection on the first menu item is received via the instant messaging interface in response to a detection of a user touch on the touchscreen of the device;
the selection on the first menu item prompts a signal;
the selection includes selection information;
an indication of the selection on the first menu item is received from code associated with the instant messaging interface;
the content includes at least one second image;
the at least one first image is automatically identified by the apparatus based on the first request, by looking up the at least one first image based on the first request;
the at least one first image is automatically identified by the apparatus based on the first request, such that the at least one first image is included with the first response;
the at least one first image is automatically identified by the apparatus based on the first request, such that a link to the at least one first image is included with the first response;
the at least one first image is automatically identified by the apparatus based on the first request, for causing display, via the instant messaging interface, of the at least one first image, such that the display is caused by sending the at least one first image to the device;

the at least one first image is automatically identified by the apparatus based on the first request, for causing display, via the instant messaging interface, of the at least one first image, such that the display is caused by permitting access to the at least one first image by the device via at least one separate system;

the content is based on the user profile of the user of the client instant messaging application, by being identified based on the user profile;

the content is based on the user profile of the user of the client instant messaging application, by being identified by the apparatus based on the user profile;

the content is based on the user profile of the user of the client instant messaging application, by including at least a portion of the user profile of the user of the client instant messaging application;

the sliding function is implemented via a slider;

the vocabulary defines one or more valid values;

the format includes at least one of one or more image format types, one or more video format types, one or more markup languages, one or more scripting languages, one or more byte code, or one or more machine code;

the criterion schema defines at least one of a format or a vocabulary;

the entered text includes tag text;

the entered text is entered by the user of the client instant messaging application; or the at least portion of the client instant messaging application is part of a system, where the system further comprises the apparatus and the device.

11. The computer-implemented method of claim 1, wherein at least one aspect of the content is capable of being saved, under the direction of the user, for subsequent identification of favorite user content by the user.

12. The computer-implemented method of claim 1, wherein the instant messaging network service application is configured such that the first menu item is conditionally caused to be displayed based on a signal that is sent from the apparatus to the device via at least one network.

13. The computer-implemented method of claim 12, wherein at least one second menu item with corresponding second text is displayed via the instant messaging interface independent of any signal that is sent from the apparatus to the device via the at least one network, and the instant messaging network service application, when executed, is configured to cause the apparatus to:

based on a touch selection on the second menu item with corresponding second text: receive, at the apparatus from the device and with the communicant identifier associated with the user of the client instant messaging application, a third request that is valid according to the criterion schema defining at least one of the format or the vocabulary, and after receiving, at the apparatus from the device and with the communicant identifier associated with the user of the client instant messaging application, the third request that is valid according to the criterion schema defining at least one of the format or the vocabulary: send, from the apparatus to the device and with the communicant identifier associated with the user of the client instant messaging application, a third response for causing display, via the instant messaging interface, of additional content that is automatically identified by the apparatus based on the third request.

14. The computer-implemented method of claim 1, wherein the instant messaging network service application is configured such that at least a portion of the first menu item is sent with a particular image from the apparatus to the device via at least one network, for causing the first menu item to be displayed with the particular image.

15. The computer-implemented method of claim 1, wherein the instant messaging network service application is configured such that different images are sent from the apparatus to the device via at least one network for being displayed via the instant messaging interface, based on different menu selection by the user and different entered text.

16. The computer-implemented method of claim 1, wherein the instant messaging network service application is configured such that the entered text is capable of being as vague as language per the user, with the content being automatically identified by a network service associated with the apparatus based on the language.

17. The computer-implemented method of claim 1, wherein the instant messaging network service application is configured such that a signal is sent from the apparatus to the device to cause display, via the instant messaging interface, of at least one menu with multiple menu items for, in response to a touch selection on at least one of the multiple menu items thereof, causing transmission, from the apparatus to the device via at least one network, of one or more images and display thereof via the instant messaging interface simultaneously with the at least one of the multiple menu items.

18. The computer-implemented method of claim 1, wherein the instant messaging network service application is configured such that a signal is sent from the apparatus to the device to cause display, via the instant messaging interface, of at least one menu with multiple menu items for, in response to a touch selection on at least one of the multiple menu items thereof, causing transmission, from the apparatus to the device via at least one network, of at least one additional menu with at least one additional menu item and display thereof via the instant messaging interface simultaneously with the at least one of the multiple menu items, for, in response to a touch selection on the at least one additional menu item, causing transmission, from the apparatus to the device via the network, of additional content and display thereof via the instant messaging interface simultaneously with the at least one additional menu item.

19. The computer-implemented method of claim 1, wherein the instant messaging network service application is configured such that a signal is sent from the apparatus to the device to cause display, via the instant messaging interface, of at least one menu with one or more images and multiple menu items for, in response to a touch selection on at least one of the multiple menu items thereof, causing transmission, from the apparatus to the device via at least one network, of additional content including one or more additional images and display thereof via the instant messaging interface simultaneously with the at least one of the multiple menu items.

20. The computer-implemented method of claim 1, wherein the instant messaging network service application is configured such that a signal is sent from the apparatus to the device to cause display, via the instant messaging interface, of at least one menu with one or more images and multiple menu items for, in response to a touch selection on at least one of the multiple menu items thereof, causing transmission, from the apparatus to the device via at least one network, of at least one additional menu including one or more additional images with at least one additional menu item and display thereof via the instant messaging interface simultaneously with the at least one of the multiple menu items, for, in response to a touch selection on the at least one additional menu item, causing transmission, from the apparatus to the device via the network, of content and display thereof via the instant messaging interface simultaneously with the at least one additional menu item.

21. The computer-implemented method of claim 1, wherein the instant messaging network service application is configured such that a signal is sent from the apparatus to the device to cause display, via the instant messaging interface, of at least a portion of multiple menus each associated with a corresponding balloon with one or more images and one or more menu items for, in response to a touch selection on at least one of the one or more menu items thereof, causing transmission, from the apparatus to the device, of additional content including one or more additional images and display thereof via the instant messaging interface simultaneously with the at least one of the one or more menu items.

22. The computer-implemented method of claim 1, wherein the instant messaging network service application is configured such that a signal is sent from the apparatus to the device to cause display, via the instant messaging interface, of at least a portion of multiple menus each in a corresponding balloon with one or more images and one or more menu items for, in response to a touch selection on at least one of the one or more menu items thereof, causing transmission, from the apparatus to the device via at least one network, of at least one additional menu including one or more additional images with at least one additional menu item and display thereof via the instant messaging interface simultaneously with the at least one of the one or more menu items, for, in response to a selection on the at least one additional menu item, causing transmission, from the apparatus to the device via the network, of additional content and display thereof via the instant messaging interface simultaneously with the at least one additional menu item.

23. The computer-implemented method of claim 1, wherein a relay is positioned between the apparatus and the device, and the first response is sent to the relay for causing the relay to send, from the relay to the device, the first response for causing the display, via the instant messaging interface, of the at least one first image.

24. A computer-implemented method, comprising:
creating at least a portion of a client instant messaging application that is configured to be installed on a touchscreen-equipped device for cooperation with an apparatus, the client instant messaging application, when executed, configured to cause the device to:
display an instant messaging interface including:
a text entry user interface element for receiving entered text, and
one or more user interface elements for causing one or more requests to be sent that are valid according to a criterion schema defining at least one of a format or a vocabulary, the one or more user interface elements including a first menu item with corresponding first text, where the first menu item is conditionally displayed based on a receipt of a signal from the apparatus via at least one network;
creating at least a portion of an instant messaging network service application that is configured to be installed on the apparatus for cooperation with the device with the client instant messaging application installed thereon, wherein the client instant messaging application and the instant messaging network service application, when executed, are configured to cause the apparatus and the device to cooperate to:
based on a selection on the first menu item with corresponding first text, send, from the device to the apparatus and with a communicant identifier associated with a user of the client instant messaging application, a first request that is valid according to the criterion schema defining at least one of the format or the vocabulary,
receive, at the apparatus from the device and with the communicant identifier associated with the user of the client instant messaging application, the first request that is valid according to the criterion schema defining at least one of the format or the vocabulary,
after receiving, at the apparatus from the device and with the communicant identifier associated with the user of the client instant messaging application, the first request that is valid according to the criterion schema defining at least one of the format or the vocabulary: send, from the apparatus to the device and with the communicant identifier associated with the user of the client instant messaging application, a first response, and
receive, at the device from the apparatus and with the communicant identifier associated with the user of the client instant messaging application, the first response for causing display, via the instant messaging interface, of at least one first image that is automatically identified by the apparatus based on the first request;
causing storage of the at least portion of the instant messaging network service application; and
causing storage of the at least portion of the client instant messaging application;
application;
wherein content is caused to be displayed that is based on a user profile of the user.

25. The computer-implemented method of claim 24, wherein the client instant messaging application and the instant messaging network service application, when executed, are configured to cause the apparatus and the device to cooperate to:
based on receipt of the entered text from the user, send, from the device to the apparatus and with the communicant identifier associated with the user of the client instant messaging application, a second request that is valid according to the criterion schema defining at least one of the format or the vocabulary,
receive, at the apparatus from the device and with the communicant identifier associated with the user of the client instant messaging application, the second request that is valid according to the criterion schema defining at least one of the format or the vocabulary,
after receiving, at the apparatus from the device and with the communicant identifier associated with the user of the client instant messaging application, the second request that is valid according to the criterion schema defining at least one of the format or the vocabulary: send, from the apparatus to the device and with the communicant identifier associated with the user of the client instant messaging application, a second response, and
receive, at the device from the apparatus and with the communicant identifier associated with the user of the client instant messaging application, the second response for causing display, via the instant messaging interface, of at least one second image that is automatically identified by the apparatus based on the second request.

26. The computer-implemented method of claim 25, wherein the client instant messaging application and the instant messaging network service application, when executed, are configured to cause the apparatus and the device to cooperate to:
    based on a selection on a second selection item of the one or more user interface elements, send, from the device to the apparatus and with the communicant identifier associated with the user of the client instant messaging application, a third request that is valid according to the criterion schema defining at least one of the format or the vocabulary,
    receive, at the apparatus from the device and with the communicant identifier associated with the user of the client instant messaging application, the third request that is valid according to the criterion schema defining at least one of the format or the vocabulary,
    after receiving, at the apparatus from the device and with the communicant identifier associated with the user of the client instant messaging application, the third request that is valid according to the criterion schema defining at least one of the format or the vocabulary: send, from the apparatus to the device and with the communicant identifier associated with the user of the client instant messaging application, a third response, and
    receive, at the device from the apparatus and with the communicant identifier associated with the user of the client instant messaging application, the third response for causing display, via the instant messaging interface, of additional content that is automatically identified based on the third request.

27. The computer-implemented method of claim 24, wherein the first menu item is part of a menu that is displayed with at least one corresponding image via the instant messaging interface in connection with a balloon.

28. The computer-implemented method of claim 24, wherein the first menu item is part of one of a plurality of menus that each include at least one corresponding image and is displayed via the instant messaging interface in connection with a corresponding one of a plurality of balloons.

29. The computer-implemented method of claim 28, wherein the balloons are displayed via at least one user interface element that permits a sliding function.

30. A computer-implemented method, comprising:
    creating at least a portion of a client instant messaging application that is configured to be installed on a touchscreen-equipped device for cooperation with an apparatus, the client instant messaging application, when executed, configured to cause the device to:
        display an instant messaging interface including:
            a text entry user interface element for receiving entered text, and
            one or more user interface elements for causing one or more requests to be sent that are valid according to a criterion schema defining at least one of a format or a vocabulary, the one or more user interface elements including a first menu item with corresponding first text, where the first menu item is conditionally displayed based on a receipt of a signal from the apparatus via at least one network;
    creating at least a portion of an instant messaging network service application that is configured to be installed on the apparatus for cooperation with the device with the client instant messaging application installed thereon, wherein the client instant messaging application and the instant messaging network service application, when executed, are configured to cause the apparatus and the device to cooperate to:
        based on receipt of the entered text from a user, send, from the device to the apparatus and with a communicant identifier associated with the user of the client instant messaging application, a first request that is valid according to the criterion schema defining at least one of the format or the vocabulary,
        receive, at the apparatus from the device and with the communicant identifier associated with the user of the client instant messaging application, the first request that is valid according to the criterion schema defining at least one of the format or the vocabulary,
        after receiving, at the apparatus from the device and with the communicant identifier associated with the user of the client instant messaging application, the first request that is valid according to the criterion schema defining at least one of the format or the vocabulary: send, from the apparatus to the device and with the communicant identifier associated with the user of the client instant messaging application, a first response, and
        receive, at the device from the apparatus and with the communicant identifier associated with the user of the client instant messaging application, the first response for causing display, via the instant messaging interface, of at least one first image that is automatically identified by the apparatus based on the first request;
    causing storage of the at least portion of the instant messaging network service application; and
    causing storage of the at least portion of the client instant messaging application;
    wherein content is caused to be displayed that is based on a user profile of the user.

* * * * *